United States Patent
Kurokawa

(10) Patent No.: US 7,738,839 B2
(45) Date of Patent: Jun. 15, 2010

(54) SEMICONDUCTOR DEVICE AND DRIVING METHOD THEREOF

(75) Inventor: Yoshiyuki Kurokawa, Sagamihara (JP)

(73) Assignee: Semiconductor Energy Laboratory Co., Ltd, Atsugi-shi, Kanagawa-ken ( * ) Notice: Subject to any disclaimer, the term of this patent is extended or adjusted under 35 U.S.C. 154(b) by 672 days.

(21) Appl. No.: 11/440,117

(22) Filed: May 25, 2006

(65) Prior Publication Data

US 2007/0018823 A1    Jan. 25, 2007

(30) Foreign Application Priority Data

May 30, 2005    (JP) .............................. 2005-158227

(51) Int. Cl.
    *H04B 1/16* (2006.01)
    *H04B 1/38* (2006.01)
(52) U.S. Cl. ...................... 455/73; 455/343.1; 455/558; 455/574
(58) Field of Classification Search ... 455/343.1–343.4, 455/574, 558, 73
    See application file for complete search history.

(56) References Cited

U.S. PATENT DOCUMENTS

| 6,970,690 | B2 | 11/2005 | Yajima et al. | |
|---|---|---|---|---|
| 7,177,621 | B2 * | 2/2007 | Park et al. | 455/337 |
| 7,185,171 | B2 * | 2/2007 | Fukuoka et al. | 711/206 |
| 2001/0047480 | A1 * | 11/2001 | Tanimoto et al. | 713/190 |
| 2003/0083037 | A1 * | 5/2003 | Yajima et al. | 455/343 |
| 2005/0133790 | A1 | 6/2005 | Kato | |
| 2005/0140495 | A1 | 6/2005 | Yamazaki et al. | |
| 2005/0167513 | A1 * | 8/2005 | Ogawa et al. | 235/492 |
| 2005/0168235 | A1 | 8/2005 | Arai et al. | |
| 2005/0168339 | A1 | 8/2005 | Arai et al. | |

(Continued)

FOREIGN PATENT DOCUMENTS

EP    1 306 741    5/2003

(Continued)

OTHER PUBLICATIONS

International Search Report (Application No. PCT/JP2006/310618) Dated Aug. 22, 2006.

(Continued)

*Primary Examiner*—Simon D Nguyen
(74) *Attorney, Agent, or Firm*—Eric J. Robinson; Robinson Intellectual Property Law Office, P.C.

(57) ABSTRACT

A state control register is provided in addition to the arithmetic circuit and communication circuit in a semiconductor device operated with wireless communication. Operation of an arithmetic circuit which consumes large power is stopped in transmitting or receiving data, that is, in the case where the operating magnetic field varies, whereas the arithmetic circuit can be operated in the case where the operating magnetic field does not vary. In the case where the operating magnetic field varies, a large capacity power supply is not required by realizing the function that is minimum required for the reception or transmission by a receiving circuit or a transmitting circuit. That is, a high-level arithmetic process can be carried out by a small-scale power supply circuit. In this manner, a high-functional and low-power consumption semiconductor device can be provided, which is a structure suitable for a semiconductor device provided with a large-scale circuit.

3 Claims, 17 Drawing Sheets

U.S. PATENT DOCUMENTS

2005/0174845 A1* 8/2005 Koyama et al. ........ 365/185.04
2005/0180187 A1 8/2005 Koyama
2005/0210302 A1* 9/2005 Kato et al. ................ 713/320

FOREIGN PATENT DOCUMENTS

| JP | 08-055198 | 2/1996 |
|---|---|---|
| JP | 2000-149194 | 5/2000 |
| JP | 2003-023366 | 1/2003 |
| JP | 2003-132316 | 5/2003 |
| JP | 2003-162700 | 6/2003 |
| KR | 2004-0050748 | 6/2004 |

OTHER PUBLICATIONS

Written Opinion (Application No. PCT/JP2006/310618) Dated Aug. 22, 2006.

Finkenzeller K., "10 Architektur Elektronischer Datentrager," RFID HANDBUCH, 2002, pp. 281-317.

Search Report (Application No. 06756663.8) dated Jun. 16, 2009.

* cited by examiner

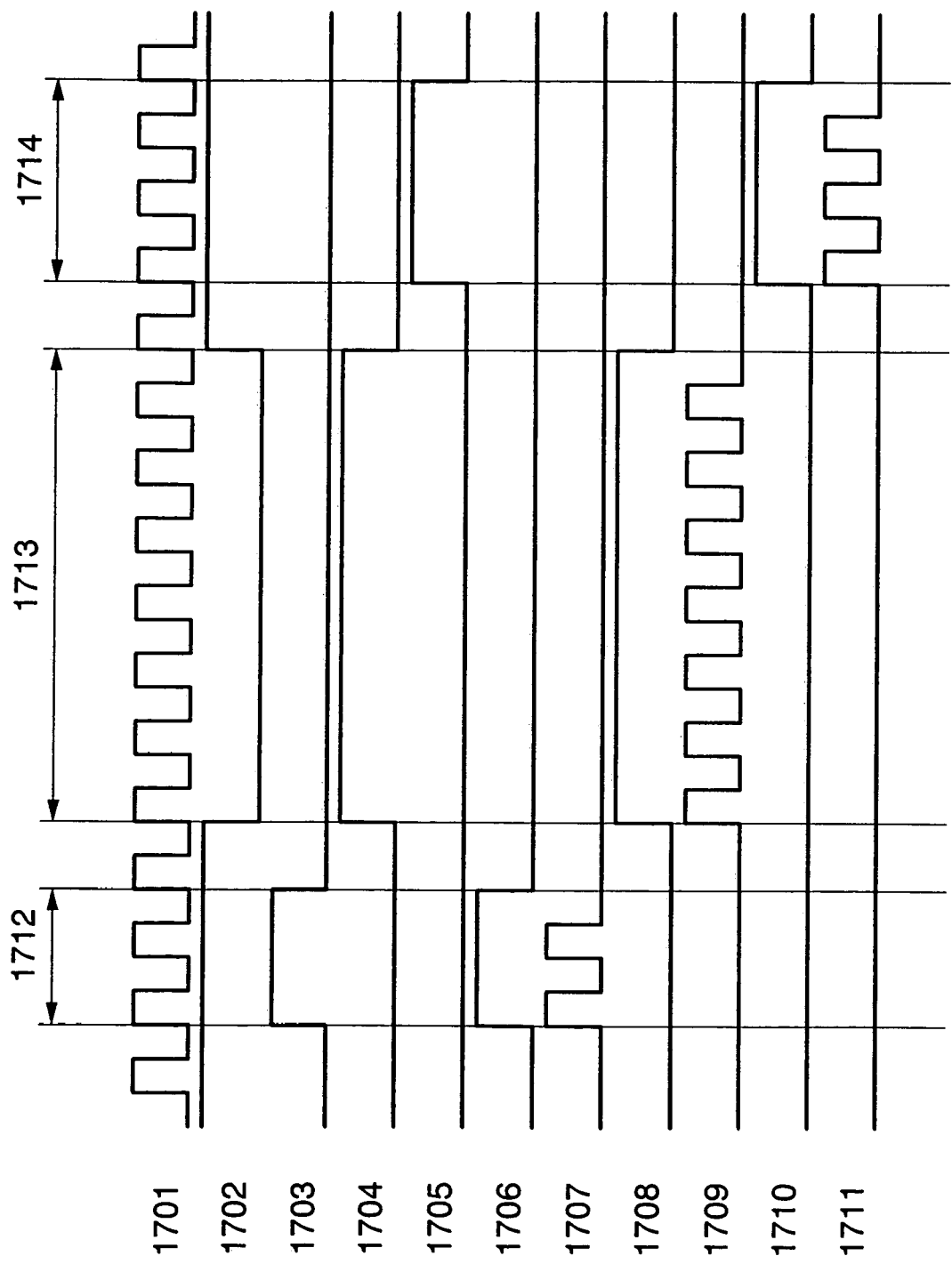

SEMICONDUCTOR DEVICE AND DRIVING METHOD THEREOF

TECHNICAL FIELD

The present invention relates to a semiconductor device which transmits and receives data signals by wireless communication. In particular, the invention relates to a semiconductor device formed using a thin film transistor.

BACKGROUND ART

In recent years, a semiconductor device provided with a microminiaturized IC chip and an antenna for wireless communication (hereinafter also called a "semiconductor device" or an "IC tag") has attracted attention. This semiconductor device performs transmission and reception of data by non-contact, through a wireless communication device referred to as a reader/writer.

As an application field of the semiconductor device transmitting and receiving data by wireless communication, merchandise management in the distribution industry is known. A merchandise management system using a bar code has been spread now, however, there is a case where data cannot be read out successfully when the bar code is attached to a curved surface or the printed surface is contaminated since the bar code is read out optically. On the other hand, in the method of performing transmission and reception of data by non-contact using a wireless communication device called a reader/writer, reading out can be performed regardless of the form of merchandise. Therefore, higher efficiency, lower cost, and the like of merchandise management have been expected. In addition, a broad range of applications such as a ticket, an airline passenger's ticket, or automatic adjustment of fare has been expected (see Japanese Patent Laid-Open No. 2000-149194). Such a system of identifying and managing people and articles by a minute semiconductor has been called an RFID (Radio Frequency Identification), and has attracted attention gradually as a fundamental technology for the IT society.

DISCLOSURE OF INVENTION

For a telecommunication standard of an RFID, for example, ISO/IEC 15693 has been specified. According to ISO/IEC 15693, 13.56 MHz ±7 kHz is used as the frequency of a carrier wave in a communication signal, and an ASK (Amplitude Shift Keying) method is employed for data transmission from a reader/writer to a semiconductor device.

Shown in FIG. 5 is a communication signal in transmitting data to a semiconductor device according to the ASK method. In FIG. 5, a communication signal 101 is an electromagnetic wave oscillating at the frequency of a carrier wave. Data transmitted by the communication signal 101 is represented by an envelope curve 102 of the amplitude of the communication signal 101. The case of the maximum amplitude of the communication signal 101 is assumed to be "1" and the case of the minimum amplitude of the same is assumed to be "0". The semiconductor device receives "0" and "1" by such the communication signal 101.

In addition, according to ISO/IEC 15693, a power supply voltage required for the operation of a semiconductor device is supplied using a method such as electromagnetic induction by the communication signal 101. Thus, in the semiconductor device operated by utilizing wireless communication, a large-scale antenna or a large-scale power supply circuit capable of supplying large current by a communication signal is required in order to operate a large-scale arithmetic circuit, thereby the increase of the chip area, the increase of the cost, or the like may be caused. Further, since the ASK method is used for data transmission, supplying of the power supply voltage tends to be unstable when receiving "0". That is, the power supply voltage to be supplied is also varied by the electromagnetic induction, and thus, low power consumption of the semiconductor device is further demanded.

In view of the foregoing, it is an object of the invention to achieve low power consumption and a highly function of a semiconductor device operated using wireless communication.

The invention is a semiconductor device including an arithmetic circuit, a state control register, and a communication circuit. The state control register controls such that the semiconductor device operates in one of states of a reception processing state, an arithmetic processing state, and a transmission processing state. A receiving circuit discriminates and extracts data showing a start of reception data (SOF=Start Of Frame), reception data, and data showing an end of reception data (EOF=End Of Frame) by a communication signal from the reader/writer. In the case where data showing an EOF signal is extracted, the state of the state control register is changed into an arithmetic processing state. In the case of the arithmetic processing state, the arithmetic circuit is operated. An arithmetic processing circuit performs an arithmetic process in accordance with reception data which is extracted from a communication signal by the receiving circuit. When the arithmetic process is completed, the state of the state control register is changed into a transmission processing state. In the case of the transmission processing state, only a transmitting circuit is operated. The transmitting circuit generates a communication signal to the reader/writer from data showing a start of transmission data (an SOF signal), transmission data, and data showing an end of transmission data (an EOF signal).

According to the above-described structure, when data is transmitted by using the ASK method, that is, in the case where the amplitude of the communication signal varies, operation of the arithmetic circuit which consumes large power is stopped while only a circuit which is minimum required for reception or transmission can be operated. In addition, the arithmetic circuit can be operated only in the case where the amplitude of the communication signal does not vary.

According to the invention, a high-functional semiconductor device can be realized without a large-scale power supply circuit even when the ASK method is used for data transmission. Consequently, the scale of the arithmetic processing circuit can be increased, and a high-functional and low-power consumption semiconductor device can be provided.

BRIEF DESCRIPTION OF DRAWINGS

FIG. 12 is a diagram showing a layout of the semiconductor device of the

FIG. 17 is a timing chart of a semiconductor device of the invention.

BEST MODE FOR CARRYING OUT THE INVENTION

Figure 1:
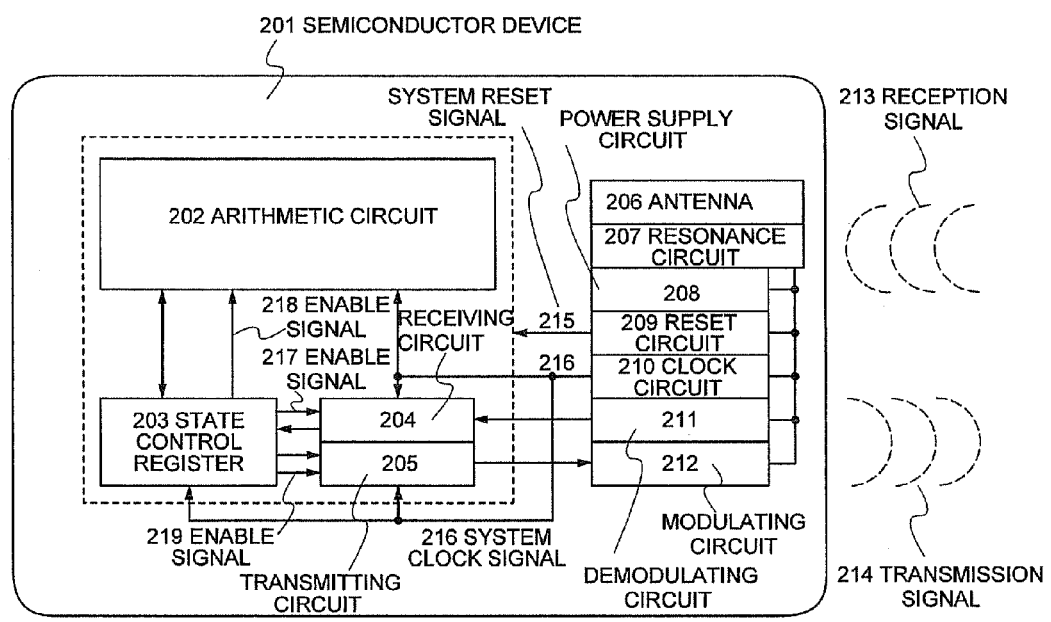
FIG. 1 is a schematic diagram of a semiconductor device of the invention.

Although the invention will be fully described by way of embodiment modes with reference to the accompanying drawings, it is to be understood that various changes and modifications will be apparent to those skilled in the art. Therefore, unless such changes and modifications depart from the scope of the invention, they should be construed as being included therein. Note that identical portions or portions having the identical function in the drawings for describing the embodiment modes are denoted by the same reference numerals, and description thereof is omitted.

Embodiment Mode 1

Figure 2:
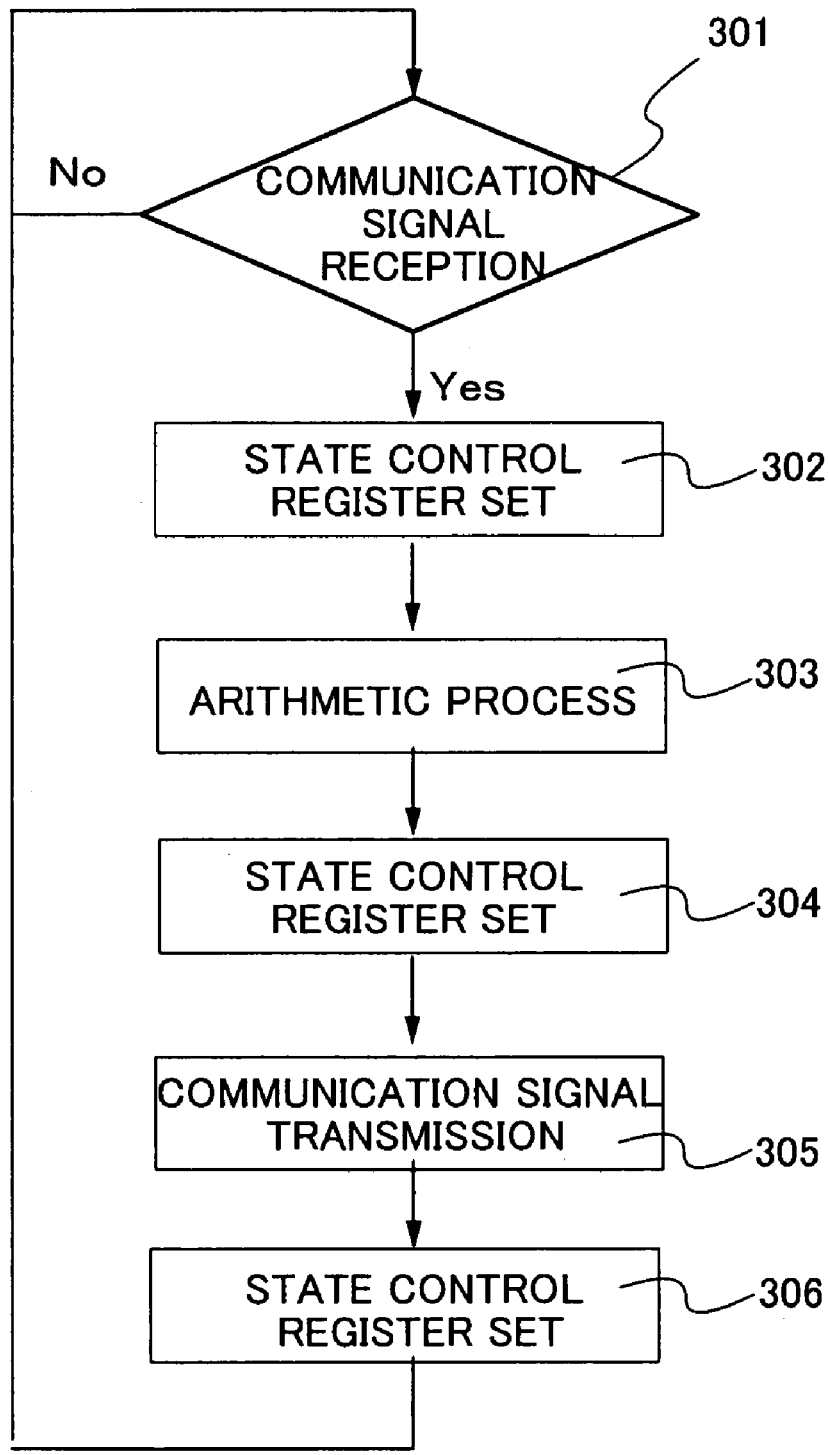
FIG. 2 is a flow chart of processing in the semiconductor device of the invention.

A structure in the case where the arithmetic circuit is a dedicated circuit for realizing a specific function is described with reference to FIGS. 1 and 2 in this embodiment mode. FIG. 1 shows hardware constitution of a semiconductor device of this embodiment mode and FIG. 2 is a flow chart of processing in the semiconductor device of this embodiment mode.

In FIG. 1, a semiconductor device 201 has an arithmetic circuit 202, a state control register 203, a receiving circuit 204, a transmitting circuit 205, an antenna 206, a resonance circuit 207, a power supply circuit 208, a reset circuit 209, a clock circuit 210, a demodulating circuit 211, a modulating circuit 212, a reception signal 213, and a transmission signal 214. Note that the reception signal 213 and the transmission signal 214 are shown as different signals in FIG. 1 for simple explanation, but actually they are superimposed on each other, and are communicated at the same time between the semiconductor device 201 and the reader/writer.

In FIG. 1, induced electromotive force is generated by the antenna 206 and the resonance circuit 207 when the semiconductor device 201 is disposed in a magnetic field formed by a communication signal (operating magnetic field). By this induced electromotive force, a power supply voltage required for operating the semiconductor device 201 is generated. The induced electromotive force is held by the capacitance in the power supply circuit 208, and the potential is stabilized by the capacitance. The reset circuit 209 generates a system reset signal 215 which makes the state of the whole semiconductor device 201 an initial state. The system reset signal 215 is one kind of clock signal, and, for example, a signal which rises with a delay of certain time with respect to the rising of the power supply voltage can be used as the system reset signal 215. The clock circuit 210 generates a clock signal from a communication signal. For example, a communication signal is half-wave rectified, and then is passed through an inverter circuit, so that a clock signal having the same cycle as the communication signal is generated. This clock signal may be used as the system clock signal 216 in the semiconductor device 201, or may be further frequency-divided to be used as the system clock signal 216. The demodulating circuit 211 detects the variation of the amplitude of the reception signal 213 in the ASK method as a signal of "0" or "1". For example, it may be a low-pass filter. The modulating circuit 212 transmits transmission data by varying the amplitude of the transmission signal 214 in the ASK method. For example, when the transmission data is "0", the modulating circuit 212 changes a resonance point of the resonance circuit 207 to change the amplitude of the communication signal.

The state control register 203 can show a state selected among a reception processing state, an arithmetic processing state, and a transmission processing state. In addition, transition among the states can be carried out by changing the state control register 203. Specifically, particular flag in the state control register 203 are assigned as a reception processing state flag, an arithmetic processing state flag, and a transmission processing state flag respectively, the state is determined depending on the state flag of "1", and each flag is changed.

In the case of the reception processing state, the receiving circuit 204 is operated while the arithmetic circuit 202 and the transmitting circuit 205 are stopped. In the case of the arithmetic processing state, the arithmetic circuit 202 is operated while the receiving circuit 204 and the transmitting circuit 205 are stopped. Further, in the case of the transmission processing state, the transmitting circuit 205 is operated while the receiving circuit 204 and the arithmetic circuit 202 are stopped.

In the state control as described above, supplying of a clock signal can be stopped by the following: an enable signal 217 of a clock signal to be supplied to the receiving circuit 204 is made "1" in the case where the reception processing state flag is "1"; a reset signal of the arithmetic circuit 202 is made "0" and an enable signal 218 of a clock signal to be supplied to the arithmetic circuit 202 is made "1" in the case where the arithmetic processing state flag is "1"; and an enable signal 219 of a clock signal to be supplied to the transmitting circuit 205 is made "1" in the case where the transmission processing state flag is "1".

Specifically, a logical AND of the system clock signal 216 and the enable signal 217 is used as a clock signal supplied to the receiving circuit 204. A logical AND of the system clock signal 216 and the enable signal 218 is used as a clock signal supplied to the arithmetic circuit 202. In addition, a logical AND of the system clock signal 216 and the enable signal 219 is used as a clock signal supplied to the transmitting circuit 205.

Signals concerning state control is described with reference to the timing chart shown in FIG. 17. A first signal 1701 corresponds to the system clock signal 216 in FIG. 1. A second signal 1702 corresponds to the reset signal of the arithmetic circuit 202 in FIG. 1. A third signal 1703 corresponds to the reception processing state flag of the state control register 203 in FIG. 1. A fourth signal 1704 corresponds to the arithmetic processing state flag of the state control register 203 in FIG. 1. A fifth signal 1705 corresponds to the transmission processing state flag of the state control register 203 in FIG. 1.

A time period when the third signal 1703 is "1" is a reception processing state time period 1712 in FIG. 17. A time period when the fourth signal 1704 is "1" is an arithmetic processing state time period 1713. A time period when the fifth signal 1705 is "1" is a transmission processing state time period 1714.

The enable signal 217 of the clock signal which is supplied to the receiving circuit 204 in FIG. 1, is "1" in the reception processing state time period 1712, and corresponds to a sixth signal 1706 (enable signal 217) in FIG. 17. Note that the clock signal supplied to the receiving circuit 204 is a logical AND of the system clock signal 216 and the enable signal 217, therefore, corresponds to a seventh signal 1707 in FIG. 17.

The reset signal of the arithmetic circuit 202 in FIG. 1 is "0" in the arithmetic processing state time period 1713, and is denoted by the second signal 1702 in FIG. 17. The enable signal 218 of the clock signal to be supplied to the arithmetic circuit 202 is "1" and corresponds to an eighth signal 1708 (enable signal 218) in FIG. 17. Note that clock signal supplied to the arithmetic circuit 202 is a logical AND of the system clock signal 216 and the enable signal 218, therefore, corresponds to a ninth signal 1709 in FIG. 17.

The enable signal 219 of the clock signal to be supplied to the transmitting circuit 205 in FIG. 1 is "1" in the transmission processing state time period 1714, and corresponds to a tenth signal 1710 (enable signal 219) in FIG. 17. Note that the clock signal supplied to the transmitting circuit 205 is a logical AND of the system clock signal 216 and the enable signal 219, therefore, corresponds to an eleventh signal 1711 in FIG. 17.

A structure in which a power supply voltage for the arithmetic circuit 202 is not supplied the arithmetic processing stat is suitable because power consumption can be reduced. Specifically, a power supply line in the arithmetic circuit 202 may be provided separately from a power supply line in the other circuit, and electrical connection between the power supply line in the arithmetic circuit 202 and the power supply circuit 208 may be cut.

Note that it is preferable that the state control register 203 has also a function of storing transmission data. In this case, a power source voltage is required to be supplied while the semiconductor device 201 transmits or receives a signal. Specifically, a power supply line in the state control register 203 may be provided separately from a power supply line in the other circuit, and electrical connection between the state control register 203 and the power supply circuit 208 may be made while the semiconductor device 201 transmits or receives a signal.

Hereinafter, description is made with reference to a flow chart shown in FIG. 2. The receiving circuit 204 discriminates and extracts an SOF signal, reception data, and an EOF signal by a signal demodulated by the demodulating circuit 211 (COMMUNICATION SIGNAL RECEPTION 301). When an EOF signal is extracted, the state of the state control register 203 is changed into an arithmetic processing state (STATE CONTROL REGISTER SET 302). By providing means for rewriting the arithmetic processing flag to be "1", the state of the state control register 203 can be changed into the arithmetic processing state.

The arithmetic circuit 202 is a dedicated circuit for processing decoding/encoding in transmitting or receiving encoded data, for example. When the arithmetic processing flag is "1", an arithmetic process is performed in accordance with the reception data extracted from the transmission signal by the receiving circuit (ARITHMETIC PROCESS 303). Then, when the arithmetic process is completed, the state of the state control register is changed into a transmission processing state (STATE CONTROL REGISTER SET 304). By providing means for rewriting the transmission processing flag to be "1", the state of the state control register can be changed into the transmission processing state.

The transmitting circuit 205 processes transmission data in accordance with the format of the communication signal, and outputs to the modulating circuit 212 (COMMUNICATION SIGNAL TRANSMISSION 305). At the time of completing the transmission, the state of the state control register is changed into a reception processing state (STATE CONTROL REGISTER SET 306). By providing means for rewriting the reception processing flag to be "1", the state of the state control register can be changed into the reception processing state.

According to the above-described mode, in the semiconductor device in which a power supply voltage is supplied by induced electromotive force from a communication signal and communication data is transmitted and received by an ASK method, operation of an arithmetic circuit which consumes large power is stopped in transmitting or receiving data, that is, in the case where the operating magnetic field varies, whereas the arithmetic circuit can be operated in the case where the operating magnetic field does not vary. In the case where the operating magnetic field varies, a large capacity power supply is not required by realizing the function that is minimum required for the reception or transmission by a receiving circuit or a transmitting circuit. That is, a high-level arithmetic process can be carried out by a small-scale power supply circuit. In this manner, a high-functional and low-power consumption semiconductor device can be provided, which is a structure suitable for a semiconductor device provided with a large-scale circuit.

In addition, when the semiconductor device of this embodiment mode is constituted by thin film transistors in each of which a semiconductor thin film formed over a substrate having an insulating surface such as a glass substrate, a quartz substrate, or a plastic substrate is used as an active layer, a high-functional and low-power consumption semiconductor device can be provided at low cost with the reduced weight.

Embodiment Mode 2

Figure 3:
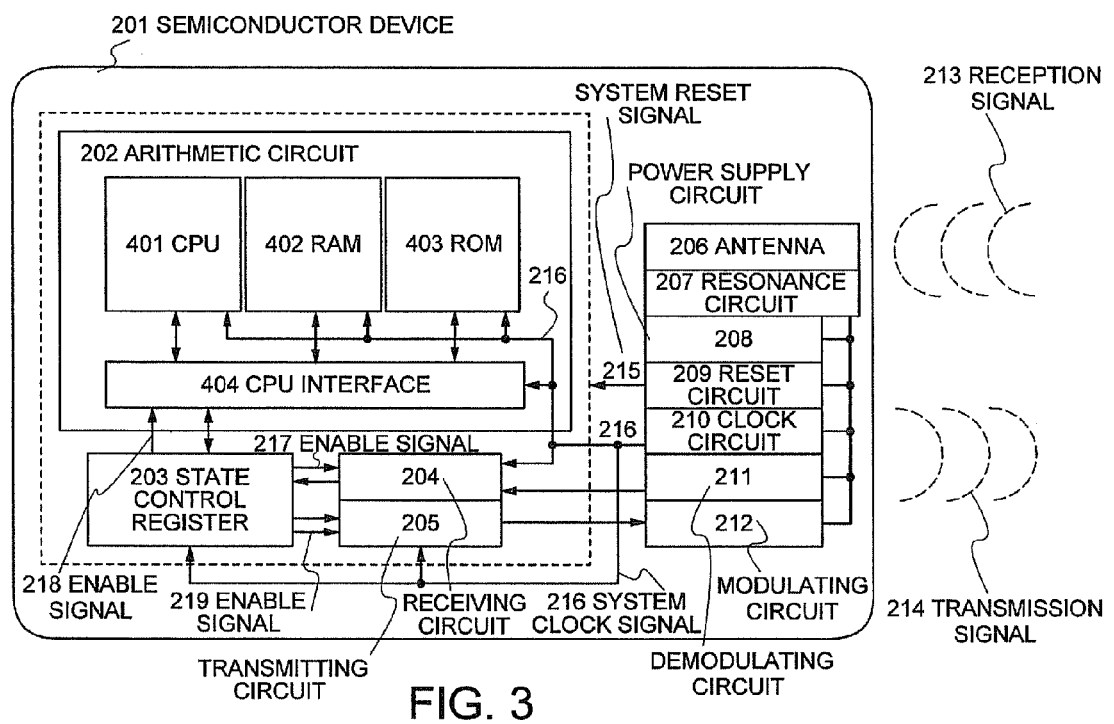
FIG. 3 is a schematic diagram of a semiconductor device of the invention.
Figure 4:
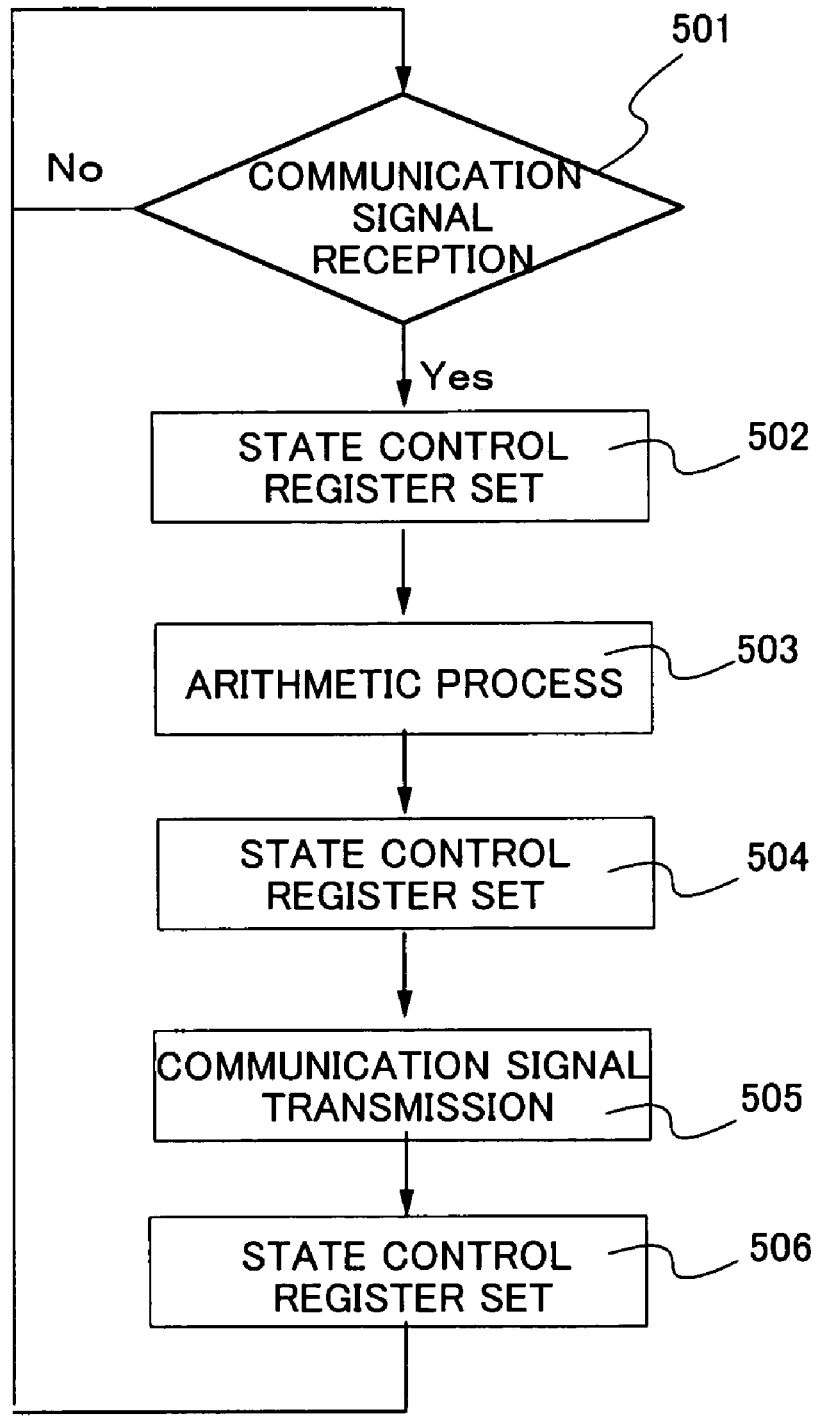
FIG. 4 is a flow chart of processing in the semiconductor device of the invention.
Figure 5:
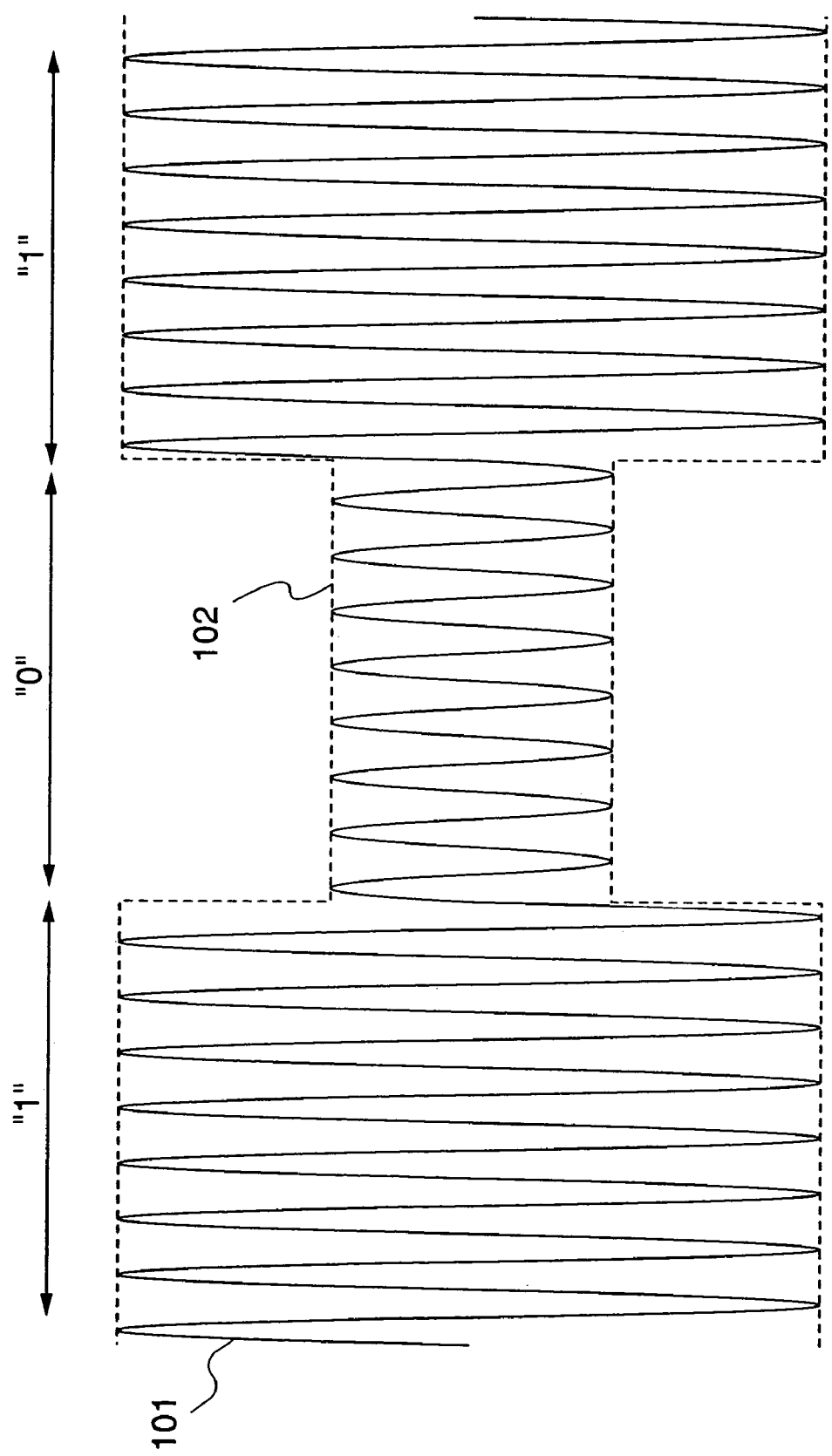
FIG. 5 is a diagram showing a communication signal when data in transmitted/received according to an ASK method.

A structure in the case where the arithmetic circuit is a CPU and a memory to perform an arithmetic process by software is described with reference to FIGS. 3 and 4 in this embodiment mode. FIG. 3 shows hardware constitution of a semiconductor device of this embodiment mode and FIG. 4 is a flow chart of processing in the semiconductor device of this embodiment mode.

In FIG. 3, the semiconductor device 201 has the arithmetic circuit 202, the state control register 203, the receiving circuit 204, the transmitting circuit 205, the antenna 206, the resonance circuit 207, the power supply circuit 208, the reset circuit 209, the clock circuit 210, the demodulating circuit 211, the modulating circuit 212, the reception signal 213, and the transmission signal 214. The arithmetic circuit 202 includes a CPU 401 (Central Processing Unit), a RAM 402 (Random Access Memory: memory capable of random access to read and write), a ROM 403 (Read Only Memory), and a CPU interface 404. Note that the reception signal 213 and the transmission signal 214 are shown as different signals in FIG. 3 for simple explanation, but actually they are superimposed on each other, and are communicated at the same time between the semiconductor device 201 and the reader/writer In FIG. 3, induced electromotive force is generated by the antenna 206 and the resonance circuit 207 when the semiconductor device 201 is disposed in a magnetic field formed by a communication signal. By this induced electromotive force, a power supply voltage of the semiconductor device 201 can be supplied. The induced electromotive force is held by the capacitance in the power supply circuit 208, and the potential is stabilized by the capacitance. The reset circuit 209 generates a system reset signal 215 which makes the state of the whole semiconductor device 201 an initial state. For example, a signal which rises with a delay of certain time with respect to the rising of the power supply voltage is generated for the system reset signal 215. The clock circuit 210 generates a clock signal from a communication signal. For example, a communication signal is half-wave rectified, and then is passed through an inverter circuit, so that a clock signal having the same cycle as the communication signal is generated. This clock signal may be further frequency-divided to be used as a clock signal of the semiconductor device. The demodulating circuit 211 detects the variation of the amplitude of the reception signal 213 in the ASK method as a signal of "0" or "1". For example, it may be a low-pass filter. The modulating circuit 212 transmits transmission data by varying the amplitude of the transmission signal 214 in the ASK method. For example, when the transmission data is "0", the modulating circuit 212 changes the resonance point of the resonance circuit 207 to change the amplitude of the communication signal.

The state control register 203 shows a state selected among a reception processing state, an arithmetic processing state, and a transmission processing state. In addition, transition among the states can be carried out by changing the state control register 203. Specifically, particular bits in the state control register are assigned as a reception processing state flag, an arithmetic processing state flag, and a transmission processing state flag respectively, the state is determined depending on the state flag of "1", and each flag is changed.

During the reception processing state, the receiving circuit 204 is operated while the CPU 401, the RAM 402, the ROM 403, the CPU interface 404, and the transmitting circuit 205 are stopped. During the arithmetic processing state, the CPU 401, the RAM 402, the ROM 403, and the CPU interface 404 are operated while the receiving circuit 204 and the transmitting circuit 205 are stopped. Further, during the transmission processing state, the transmitting circuit 205 is operated while the receiving circuit 204, the CPU 401, the RAM 402, the ROM 403, and the CPU interface 404 are stopped.

In the state control as described above, supplying of a clock signal can be stopped by the following: the reception processing state flag is made an enable signal of a clock signal to be supplied to the receiving circuit 204; the arithmetic processing state flag is made an enable signal of a reset signal 405 of the CPU 401, the RAM 402, the ROM 403, and the CPU interface 404 and of a clock signal to be supplied to the CPU 401, the RAM 402, the ROM 403, and the CPU interface 404; and the transmission processing state flag is made an enable signal of a clock signal to be supplied to the transmitting circuit 205.

In the state control as described above, the enable signal 217 of the clock signal to be supplied to the receiving circuit 204 is made "1" in the case where the reception processing state flag is "1"; a reset signal 405 of the CPU 401, the RAM 402, the ROM 403, and the CPU interface 404 is made "0" and the enable signal 218 of the clock signal to be supplied to the CPU 401, the RAM 402, the ROM 403, and the CPU interface 404 is made "1" in the case where the arithmetic processing state flag is "1"; and the enable signal 219 of the clock signal to be supplied to the transmitting circuit 205 is made "1"in the case where the transmission processing state flag is "1".

More specifically, a logical AND of the system clock signal 216 and the enable signal 217 is used as a clock signal supplied to the receiving circuit 204. A logical AND of the system clock signal 216 and the enable signal 218 is used as a clock signal supplied to the CPU 401, the RAM 402, the ROM 403, and the CPU interface 404. In addition, a logical AND of the system clock signal 216 and the enable signal 219 is used as a clock signal supplied to the transmitting circuit 205.

Signals concerning state control is described with reference to the timing chart shown in FIG. 17. The first signal 1701 corresponds to the system clock signal 216 in FIG. 3. The second signal 1702 corresponds to the reset signal of the CPU 401, the RAM 402, the ROM 403 and the CPU interface 404 in FIG. 3. The third signal 1703 corresponds to the reception processing state flag of the state control register 203 in FIG. 3. The fourth signal 1704 corresponds to the arithmetic processing state flag of the state control register 203 in FIG. 3. The fifth signal 1705 corresponds to the transmission processing state flag of the state control register 203 in FIG. 3.

The time period when the third signal 1703 is "1" is the reception processing state time period 1712 in FIG. 17. The time period when the fourth signal 1704 is "1" is the arithmetic processing state time period 1713. The time period when the fifth signal 1705 is "1" is the transmission processing state time period 1714.

The enable signal of the clock signal which is to be supplied to the receiving circuit 204 in FIG. 3 is "1" in the reception processing state time period 1712, and corresponds to the sixth signal 1706 (enable signal 217) in FIG. 17. Note that the clock signal which is to be supplied to the receiving circuit 204 is a logical AND of the system clock signal 216 and the enable signal 217, therefore, corresponds to the seventh signal 1707 in FIG. 17.

The reset signal of the CPU 401, the RAM 402, the ROM 403 and the CPU interface 404 in FIG. 3 is "0" and the enable signal 218 of the clock signal to be supplied to the CPU 401, the RAM 402, the ROM 403 and the CPU interface 404 is "1" in the arithmetic processing state time period 1713, and correspond to the second signal 1702 and the eighth signal 1708 (enable signal 218) in FIG. 17. Note that the clock signal which is to be supplied to the CPU 401, the RAM 402, the ROM 403 and the CPU interface 404 is a logical AND of the system clock signal 216 and the enable signal 218, therefore, corresponds to the ninth signal 1709 in FIG. 17.

The enable signal 219 of the clock signal to be supplied to the transmitting circuit 205 in FIG. 3 is "1" in the transmission processing state time period 1714, and corresponds to the tenth signal 1710 (enable signal 219) in FIG. 17. Note that the clock signal which is to be supplied to the transmitting circuit 205 is a logical AND of the system clock signal 216 and the enable signal 219, therefore, corresponds to the eleventh signal 1711 in FIG. 17.

A structure in which a power supply voltage for the arithmetic circuit 202 is not supplied during the arithmetic processing state is suitable because power consumption can be reduced. Specifically, a power supply line in the arithmetic circuit 202 may be provided separately from a power supply line in the other circuit, and electrical connection between the power supply line in the arithmetic circuit 202 and the power supply circuit 208 may be cut.

Note that it is desirable that the state control register 203 has also a function of storing transmission data. In this case, a power source voltage is required to be supplied while the semiconductor device 201 transmits or receives a signal. Specifically, a power supply line in the state control register 203 may be provided separately from a power supply line in the other circuit, and electrical connection between the state control register 203 and the power supply circuit 208 may be made while the semiconductor device 201 transmits or receives a signal.

In addition, during the reception processing state and the transmission processing state, a power source voltage to be supply to the CPU 401, the RAM 402, the ROM 403, and the CPU interface 404 may be stopped. In this case, when the state is transited to the arithmetic processing state, the arithmetic processing state flag of the state control register 203 is changed to be "1" and after the power supply voltage exceeds a predetermined value, the enable signal of the clock signal is enabled, and subsequently the reset signal is unlocked so that operation of the CPU 401 can be stabilized.

Hereinafter, description is made with reference to a flow chart of FIG. 4. The receiving circuit 204 discriminates and extracts an SOF signal, reception data, and an EOF signal by a signal demodulated by the demodulating circuit 211 (COMMUNICATION SIGNAL RECEPTION 501). When an EOF signal is extracted, the state of the state control register 203 is changed into an arithmetic processing state (STATE CONTROL REGISTER SET 502). Specifically, means for rewriting the arithmetic processing flag to be "1" may be provided.

When the arithmetic processing flag is "1", the CPU 401 performs an arithmetic process in accordance with reception data extracted from the transmission signal by the receiving circuit 204 (ARITHMETIC PROCESS 503). As a specific arithmetic process, for example, processing of decoding/encoding is performed when encoded data is transmitted or received. Further, in accordance with the content of decoded data, an arithmetic process of the content decided in advance may be performed as well. Such process content can be freely changed by storing a program in the ROM 403 in advance. As a working memory of the arithmetic process, the RAM 402 may be used. It is preferable that the RAM 402, the ROM 403, and the state control register 203 exist in an address space of the CPU 401. In this case, the CPU interface 404 has a function to discriminate that an address published by the CPU 401 corresponds to any one of the RAM402, the ROM403, or the state control register 203.

When the arithmetic process is completed, the state of the state control register is changed into a transmission processing state by the CPU 401 (STATE CONTROL REGISTER SET 504). By providing means for rewriting the transmission processing flag to be "1", the state of the state control register can be changed into the transmission processing state. This means can also be realized by the CPU 401 for carrying out a program stored in the ROM 403 in advance.

The transmitting circuit 205 processes transmission data in accordance with the format of the communication signal, and outputs to the modulating circuit 212 (COMMUNICATION SIGNAL TRANSMISSION 505). At the time of completing the transmission, the state of the state control register is changed into a reception processing state (STATE CONTROL REGISTER SET 506). By providing means for rewriting the reception processing flag to be "1", the state of the state control register can be changed into the reception processing state.

According to the above-described mode, in the semiconductor device in which a power supply voltage is supplied by induced electromotive force from a communication signal and communication data is transmitted and received by an ASK method, operation of a CPU and/or a memory which consumes large power is stopped in transmitting or receiving data, that is, in the case where the operating magnetic field varies, whereas the CPU and/or the memory can be operated in the case where the operating magnetic field does not vary. On the other hand, in the case where the operating magnetic field varies, a large capacity power supply is not required by realizing the function that is minimum required for the reception or transmission by a receiving circuit or a transmitting circuit. That is, high-level arithmetic process can be carried out by a small-scale power supply circuit. In this manner, a highly function and low-power consumption can be both achieved in a structure suitable for a semiconductor device provided with a large-scale circuit.

In addition, when the semiconductor device of this embodiment mode is constituted by thin film transistors in each of which a semiconductor thin film formed over a substrate having an insulating surface such as a glass substrate, a quartz substrate, or a plastic substrate is used as an active layer, a high-functional and low-power consumption semiconductor device can be provided at low cost with the reduced weight.

Embodiment Mode 3

This embodiment mode is a structure in which Embodiment Mode 1 and Embodiment Mode 2 are combined. That is, the arithmetic circuit is constituted by a dedicated circuit, a CPU, and a memory in the semiconductor device of the invention, and in the structure, a part of arithmetic process is processed in a hardware manner by the dedicated circuit and a program of the rest arithmetic process is processed in a software manner by the CPU.

It is preferable to perform an operation capable of being executed in parallel or an operation capable of being executed repeatedly in the dedicated circuit. Meanwhile, it is preferable to perform a more complicated operation in the CPU. In practice, the most suitable structure may be selected appropriately, considering the operation speed, power consumption, chip area, development cost, or the like.

Note that the other details on this embodiment mode can be guessed easily from the description in Embodiment Mode 1 and Embodiment Mode 2, and thus are omitted here.

According to the above-described mode, a high-functional and low-power consumption semiconductor device can be provided, which is a structure suitable for a semiconductor device provided with a large-scale circuit.

In addition, when the semiconductor device of this embodiment mode is constituted by thin film transistors in each of which a semiconductor thin film formed over a substrate having an insulating surface such as a glass substrate, a quartz substrate, or a plastic substrate is used as an active layer, a high-functional and low-power consumption semiconductor device can be provided at low cost with the reduced weight.

Although the invention will be fully described by way of embodiments with reference to the accompanying drawings, it is to be understood that various changes and modifications will be apparent to those skilled in the art. Therefore, unless such changes and modifications depart from the scope of the invention, they should be construed as being included therein. Note that identical portions or portions having the identical function in the drawings for describing the embodiments are denoted by the same reference numerals, and description thereof is omitted.

Embodiment 1

In this embodiment, the case where the semiconductor device of the invention is constituted by thin film transistors (TFTs) is described with reference to cross-sectional views.

Figure 10A:
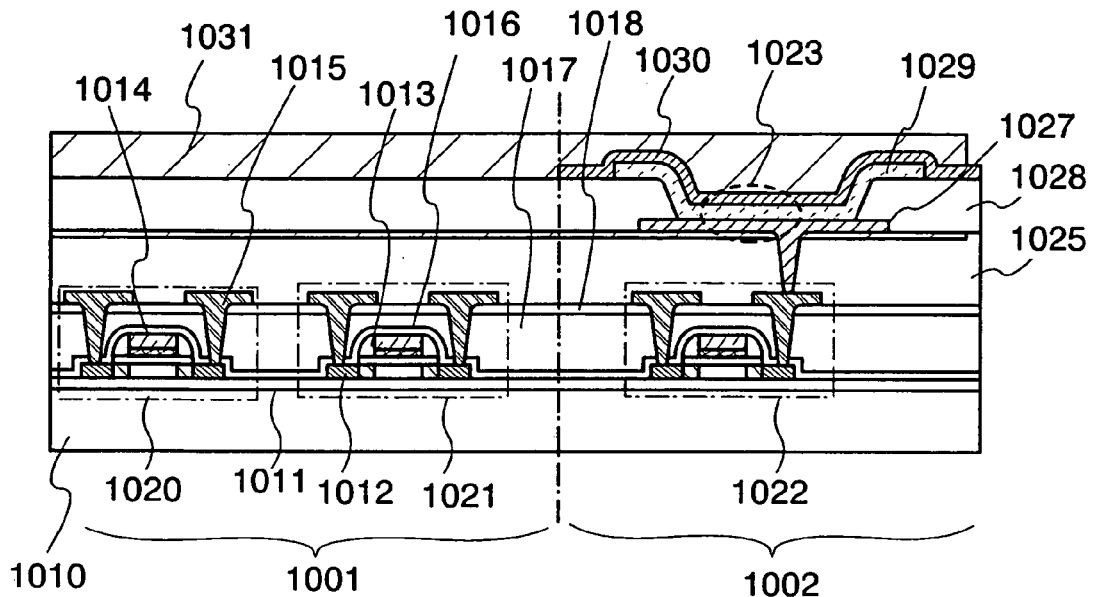
FIGS. 10A and 10B are cross-sectional views each of a semiconductor device of the invention.

FIG. 10A is a cross-sectional view of a TFT portion 1001 and a memory portion 1002 formed over an insulating substrate 1010. The TFT portion 1001 includes the arithmetic circuit described in Embodiment Mode 1 or the CPU, the RAM, the CPU interface, or the like described in Embodiment Mode 2. The memory portion 1002 includes the ROM described in Embodiment Mode 2. A glass substrate, a quartz substrate, a substrate formed of silicon, a metal substrate, a plastic substrate, or the like can be used for the insulating substrate 1010. In the case of using a glass substrate, one surface of the glass substrate, opposite to a surface over which a TFT and the like are formed may be ground to be thin for use. A glass substrate with the reduced thickness thus reduction in weight and thickness of a device.

A base film 1011 is provided over the insulating substrate 1010. Thin film transistors 1020 and 1021 are provided over the base film 1011 in the TFT portion 1001, and a thin film transistor 1022 is provided over the base film 1011 in the memory portion 1002. Each thin film transistor includes a semiconductor film 1012 which is formed separately in an island shape, a gate electrode 1014 which is provided over a gate insulating film, and a side wall 1013 formed of an insulator to the gate electrode side. The semiconductor film 1012 is formed to have a thickness of 0.2 μm or less, typically a thickness of 40 nm to 170 nm, and preferably a thickness of 50 nm to 150 nm. Further, an insulating film 1016 covering the side wall 1013 and the semiconductor film 1012, and an electrode 1015 connected to an impurity region formed in the semiconductor film 1012 are included. Note that the electrode 1015 which is connected to the impurity region can be formed by forming a contact hole in the gate insulating film and the insulating film 1016, forming a conductive film so as to cover the contact hole, and patterning the conductive film.

Amorphous silicon or polycrystalline silicon can be used for the semiconductor film 1012. In the case of using polycrystalline silicon, amorphous silicon is formed first, and heat treatment or laser irradiation is performed to form the polycrystalline silicon. At this time, by performing the heat treatment or laser irradiation using a metal element typified by nickel, the crystallization temperature can be reduced. For the laser irradiation, a continuous wave laser irradiation apparatus or a pulsed laser irradiation apparatus can be used. Alternatively, a crystallization method with heat treatment and a crystallization method in which a laser beam of continuous wave laser or a laser beam which oscillates at a frequency of 10 MHz or more is irradiated may be combined. By irradiating the continuous wave laser or the laser beam which oscillates at a frequency of 10 MHz or more, the surface of the semiconductor film which is crystallized can be made flat. Accordingly, the gate insulating film can also be made thin and the voltage resistance of the gate insulating film can be improved.

In addition, the semiconductor film which is obtained by crystallizing a semiconductor film by irradiating the continuous wave laser or the laser beam which oscillates at a frequency of 10 MHz or more while scanning in one direction, has a characteristic such that crystals are grown in the scanning direction of the beam. By arranging a TFT with a channel length direction (a direction in which carriers flow when a channel forming region is formed) aligned with the scanning direction, and combining it with a gate insulating film which is described below, transistors (TFT) in which variation of characteristics is small and field-effect mobility is high can be obtained.

In thin film transistors for constituting the semiconductor device of the invention, an insulating film which is typified by a gate insulating film or the like can be formed by oxidizing or nitrogenizing a surface to be formed with high-density plasma treatment. High-density plasma treatment is plasma treatment in which the plasma density is $1 \times 10^{11}$ cm$^{-3}$ or more, preferably in the range of $1 \times 10^{11}$ cm$^{-3}$ to to $9 \times 10^{15}$ cm$^{-3}$, and a high frequency wave such as a microwave (for example, at a frequency of 2.45 GHz) is used. If plasma is generated in such conditions, low electron temperature would be 0.2 eV to 2 eV. High-density plasma which has a characteristic of low electron temperature as described above is low in the kinetic energy of activated species, thus, a film in which plasma damage is small and defect is small can be formed. A body to be formed, a substrate over which a patterned semiconductor film is formed in the case of forming a gate insulating film, is disposed in a chamber for carrying out such plasma treatment. Then, the distance between an electrode for generating plasma, a so-called antenna, and the body to be formed is set to be 20 mm to 80 mm, preferably 20 mm to 60 mm, for performing film forming treatment. A high-density plasma treatment such as this enables low-temperature process (where the substrate temperature is 400° C. or less). Therefore, a film can be formed over the a plastic with low heat-resistance substrate.

A nitrogen atmosphere or an oxygen atmosphere can be used as a film formation atmosphere for such an insulating film. A nitrogen atmosphere is, typically, an atmosphere in which nitrogen and rare gas are mixed or an atmosphere in which nitrogen, hydrogen and rare gas are mixed. As the rare gas, at least one of helium, neon, argon, krypton, and xenon can be used. In addition, an oxygen atmosphere is, typically, an atmosphere in which oxygen and rare gas are mixed, an atmosphere in which oxygen, hydrogen and rare gas are mixed. An atmosphere in which dinitrogen monoxide and rare gas are mixed can be used for achieving the similar effect. As the rare gas, at least one of helium, neon, argon, krypton, and xenon can be used. Alternatively, an atmosphere in which hydrogen and rare gas are mixed may be used.

By oxygen radicals (which may include OH radicals) or nitrogen radicals (which may include NH radicals) generated by the high-density plasma, the surface to be formed can be oxidized or nitrogenized.

By such treatment using high-density plasma, an insulating film with a thickness of 1 to 20 nm, typically a thickness of 5 to 10 nm, can be formed. Since the reaction in this case is solid-phase reaction, the interface state density between the insulating film and the semiconductor film can be made very low. High-density plasma treatment such as this directly oxidizes or nitrogenizes the surface to be formed. The surface to be formed is, for example, crystalline silicon or polycrystalline silicon in the case of a semiconductor film. Therefore, variation in the thickness of the insulating film to be formed can be made very small. In addition, in the case of crystalline silicon, the grain boundary is also not oxidized so much, which makes a very desirable state. That is, by the solid-phase oxidation of the surface of an insulating film with the high-density plasma treatment described here, a semiconductor film with good uniformity and low interface state density can be formed without extraordinary oxidation reaction in the grain boundary.

The insulating film is dense. In addition, the insulating film formed with high-density plasma treatment can improve the interface state of the semiconductor film and the insulating film. For example, if a gate insulating film is formed using the high-density plasma treatment, the interface state with a semiconductor film can be improved. As a result, electrical properties of a thin film transistor can be improved.

Although description is made of the case where high-density plasma treatment is used for forming an insulating film, the high-density plasma treatment may be applied to a semiconductor film as well. By the high-density plasma treatment, the surface of the semiconductor film can be improved. As a result, the interface state can be improved, and electrical properties of a thin film transistor can be improved.

In this embodiment, for an insulating film such as a gate insulating film, only an insulating film formed with high-density plasma treatment may be used, or on that film, an insulating film of silicon oxide, silicon oxynitride, silicon nitride, or the like may be stacked with CVD method using plasma or thermal reaction and laminated. At any rate, in the case where a transistor is formed so that the insulating film formed with high-density plasma treatment is included in a part or all of the gate insulating film, variation of characteristics can be reduced.

In addition, insulating films 1017 and 1018 are preferably provided in order to improve flatness. At this time, the insulating film 1017 may be formed of an organic material and the insulating film 1018 may be formed of an inorganic material. In the case where the insulating films 1017 and 1018 are provided, the electrode 1015 can be formed over the insulating films 1017 and 1018 so as to be connected to an impurity region through a contact hole.

Further, an insulating film 1025 is provided, and a bottom electrode 1027 is formed to be connected to the electrode 1015. An insulating film 1028 is formed which covers an end portion of the bottom electrode 1027 and is provided with an opening portion so as to expose the bottom electrode 1027. Within the opening portion, a memory material layer 1029 is formed and an upper electrode 1030 is formed. In this way, a memory element 1023, which has the bottom electrode 1027, the memory material layer 1029, and the upper electrode 1030, is formed. The memory material layer 1029 can be formed of an organic material or an inorganic material. The bottom electrode 1027 and the upper electrode 1030 can be formed of a conductive material. For example, it can be formed of a film made from an element of aluminum (Al), titanium (Ti), molybdenum (Mo), tungsten (W) or silicon (Si), or of an alloy film using the above-described elements. In addition, a light-transmitting material such as indium tin oxide (ITO), indium tin oxide containing silicon oxide, or indium oxide containing zinc oxide at 2 to 20% can be used.

In order to further improve the flatness and to prevent from invading an impurity element, an insulating film 1031 is preferably formed.

For the insulating film described in this embodiment, an inorganic material or an organic material can be used. As the inorganic material, silicon oxide or silicon nitride can be used. As the organic material, polyimide, acrylic, polyamide, polyimideamide, resist, benzocyclobutene, siloxane, or polysilazane can be used. Note that a siloxane resin corresponds to a resin containing Si—O—Si bonds. Siloxane is composed of a skeleton formed by the bond of silicon (Si) and oxygen (O), in which an organic group containing at least hydrogen (e.g., an alkyl group or aromatic hydrocarbon) is included as a substituent. Alternatively, a fluoro group may be used as the substituent. Further alternatively, a fluoro group and an organic group containing at least hydrogen may be used as the substituent. Polysilazane is formed with a polymer material having the bond of silicon (Si) and nitrogen (N) as a starting material.

Figure 10B:
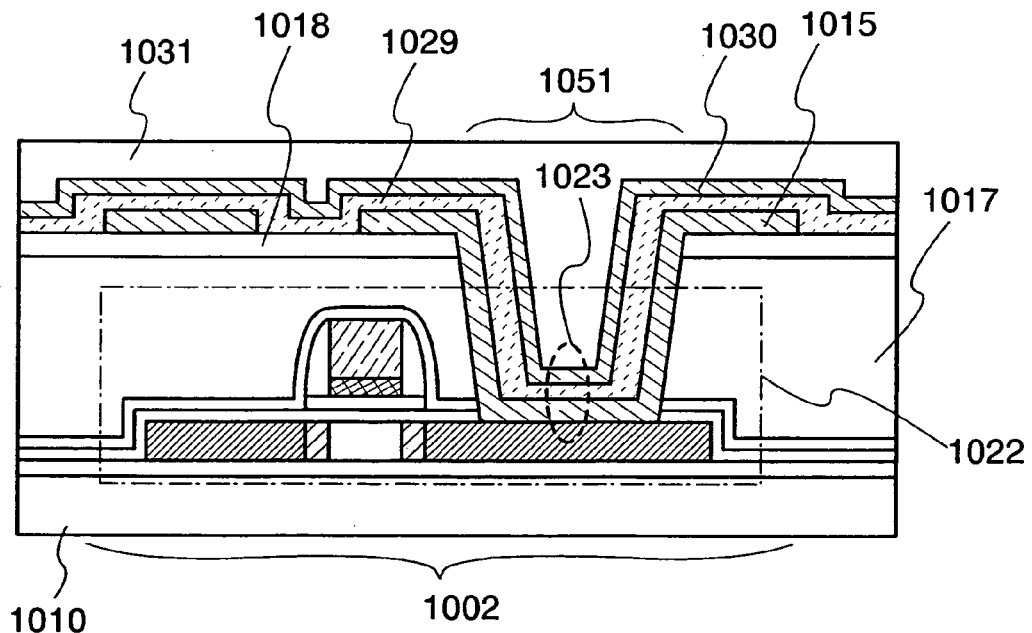

FIG. 10B is a cross-sectional view of a memory in which a memory material layer is formed in a contact hole 1051 of the electrode 1015 unlike in FIG. 10A. Similarly to FIG. 10A, the electrode 1015 is used as a bottom electrode, and on the electrode 1015, the memory material layer 1029 and the upper electrode 1030 are formed so that the memory element 1023 can be formed. Subsequently, the insulating film 1031 is formed. The other structure is the same as FIG. 10A, thus, description thereof is omitted.

By forming a memory element in the contact hole 1051 as described above, downsizing of the memory element can be achieved. In addition, an electrode for a memory is not required, thus, the number of manufacturing steps can be reduced and a semiconductor device mounted with the memory can be provided at low cost.

As set forth above, by constituting the semiconductor device by thin film transistors in each of which a semiconductor thin film formed over a substrate having an insulating surface such as a glass substrate, a quartz substrate, or a plastic substrate is used as an active layer, a high-functional and low-power consumption semiconductor device can be provided at low cost with the weight reduced.

This embodiment can be implemented freely combining with Embodiment Mode 1, Embodiment Mode 2, or Embodiment Mode 3.

Embodiment 2

Figure 11:
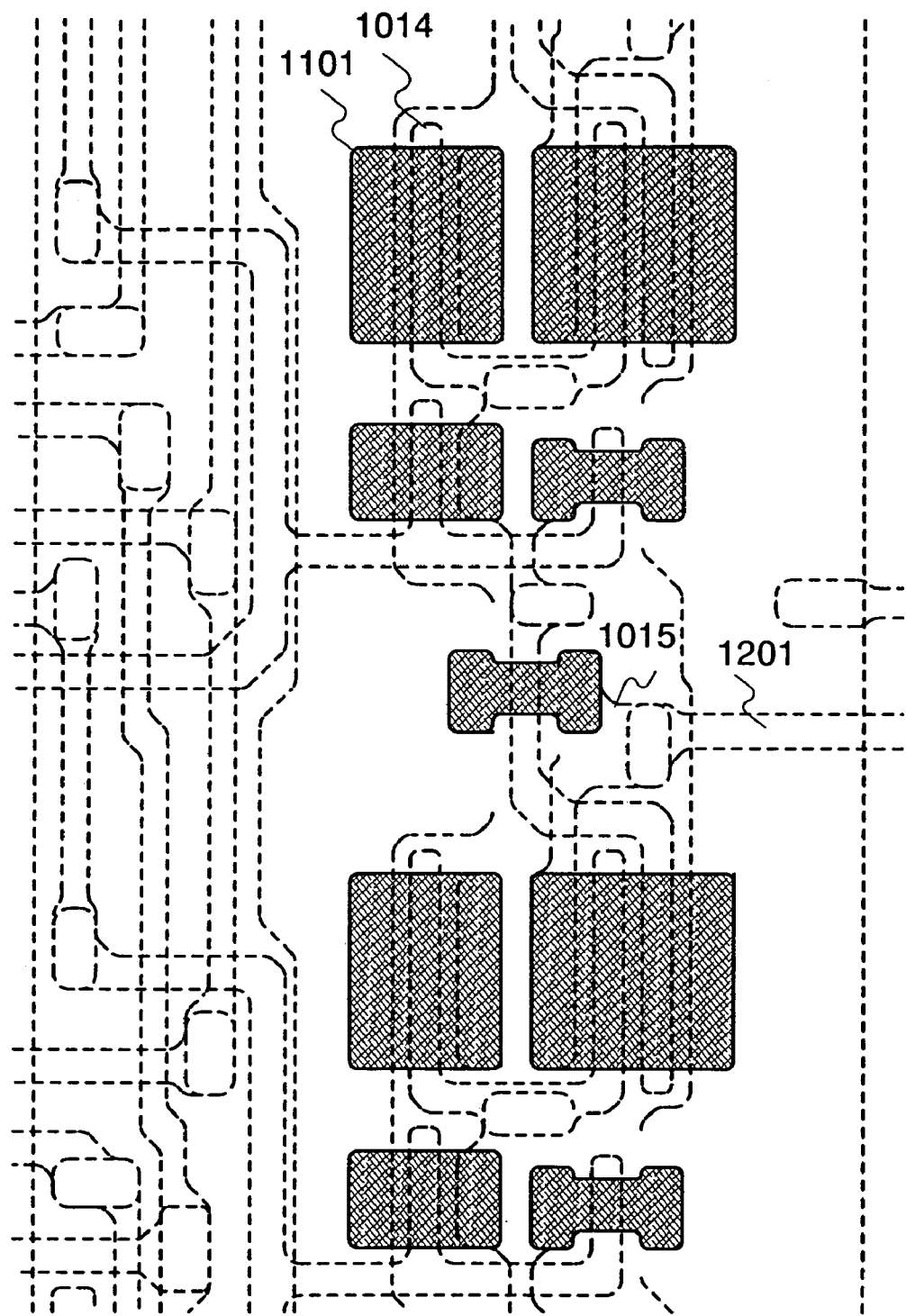
FIG. 11 is a diagram showing a layout of a semiconductor device of the invention.
Figure 12:
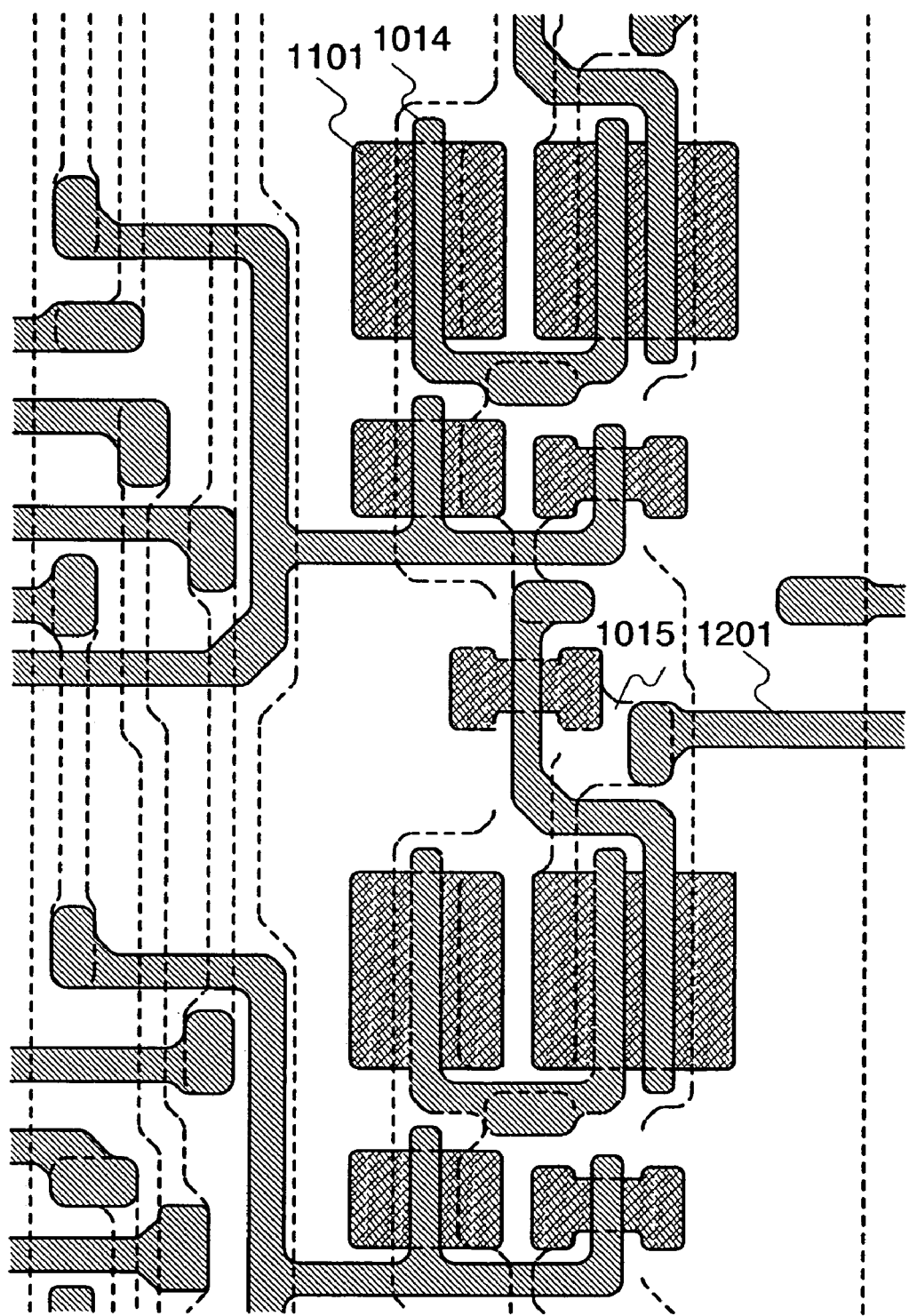

In this embodiment, a layout of thin film transistors constituting a part of a circuit in the semiconductor device of the invention is described with reference to FIG. 11, FIG. 12, and FIG. 13.

A semiconductor layer corresponding to the semiconductor film 1012 described in Embodiment 1 is formed over an entire surface of a substrate having an insulating surface or a part thereof (a region having an area larger than that determined as a semiconductor region of a transistor), with a base film or the like interposed therebetween. Then, with photolithography technology, a mask pattern is formed over the semiconductor layer. By carrying out etching treatment to the semiconductor layer with the mask pattern, an island-shaped semiconductor pattern 1101 having a specific shape can be formed which includes a source region, a drain region, and a channel forming region of a thin film transistor shown in FIG. 11. The shape of the semiconductor layer patterned is decided in consideration with circuit characteristics required or adequacy of the layout, based on properties of a thin film transistor.

In a thin film transistor for constituting a circuit of the semiconductor device of the invention, a photomask for forming a semiconductor layer has a characteristic pattern. A bent portion of the mask pattern is made up with a complicated shape at least so as not to bend at right angle. For example, the outside of the bent portion has a shape where the top is cut. In this case, the corner portion of a mask pattern may be made roundness. FIG. 11 shows a shape of a semiconductor layer formed using the photomask having such mask pattern. In this case, by controlling the exposing condition in a photolithography process using this photomask, the corner portion of the semiconductor layer 1101 can be controlled to be more round than the corner portion of the photomask pattern. That is, the corner portion of the semiconductor layer 1101 may be provided with a roundness where the pattern shape is less bent than the photomask pattern. Note that in FIG. 11, the gate electrode 1014, gate wiring 1201, the electrode 1015, and a wiring to be formed later are shown by a dotted line.

Subsequently, a gate insulating film is formed over the semiconductor layer 1101 which has roundness at the corner portion. Then, as is described in Embodiment 1, the gate electrode 1014 so as to partially overlap with the semiconductor layer, and the gate wiring 1201 are formed at the same time. The gate electrode and the gate wiring can be formed by forming a metal layer or a semiconductor layer and carrying out photolithography technology.

A photomask pattern for forming the gate electrode or the gate wiring has a shape where the corner portion of the outside of the bent portion is cut. In addition, the inside of the bent portion of the pattern is bent plural times so as not to bend at right angle. Such bent shape can be considered based on the width of the gate wiring pattern, and the corner portion is removed with a length of ½ or less but ⅕ or more of the linewidth of the wiring. The shape of this mask pattern can be, as shown in FIG. 12, transferred as a pattern shape of the gate electrode 1014 or the gate wiring. In addition, at the time of transferring on the gate electrode or the gate wiring, the transferring may be performed such that the corner portion of the gate electrode or the gate wiring is more round. That is, the corner portion of the gate electrode or the gate wiring may be provided with a roundness where the pattern shape thereof is less bent than the photomask pattern. Note that in FIG. 12, the electrode 1015 and a wiring to be formed later are shown by a dotted line.

Such gate electrode or gate wiring bends rectangularly because of layout limitation. Therefore, for the round corner portion of the gate electrode or the gate wiring, a salient portion (an outside side) and a reentrant portion (an inside side) are provided. At the round salient portion, it is possible to suppress generation of fines due to anomalous discharge when dry etching with plasma is performed. In addition, at the round reentrant portion, even if there are fines generated, the fines which tend to collect in the corner portion can be washed away in washing. As a result, there is such effect that yield improvement can be extremely expected.

Subsequently, over the gate electrode or the gate wiring, an insulating layer or the like corresponding to the insulating films 1016, 1017, and 1018 is formed as is described in Embodiment 1. Needless to say, the insulating film may be a single layer in the invention.

Then, over the insulating layer, an opening is formed in a predetermined position of the insulating film, and in the opening, a conductive film corresponding to the electrode 1015 or the wiring is formed. This opening is provided to electrically connect the semiconductor layer or the gate wiring layer which is in the lower layer and the wiring layer to each other. As for the wiring, a mask pattern is formed by photolithography technology, and is formed to be a predetermined pattern by an etching process.

With the wiring, predetermined elements can be connected to each other. This wiring does not connect the predetermined elements by a straight line but bends rectangularly (hereinafter referred to as a "bending portion") because of layout limitation. In addition, the wiring may be changed in width in the opening portion or another region. For example, in the opening portion, when the opening is equal to or larger than the wiring width, the wiring width is changed to be wider at that portion. Further, since the wiring also functions as one electrode of a capacitor portion due to circuit layout, the wiring width may be large.

Figure 13:
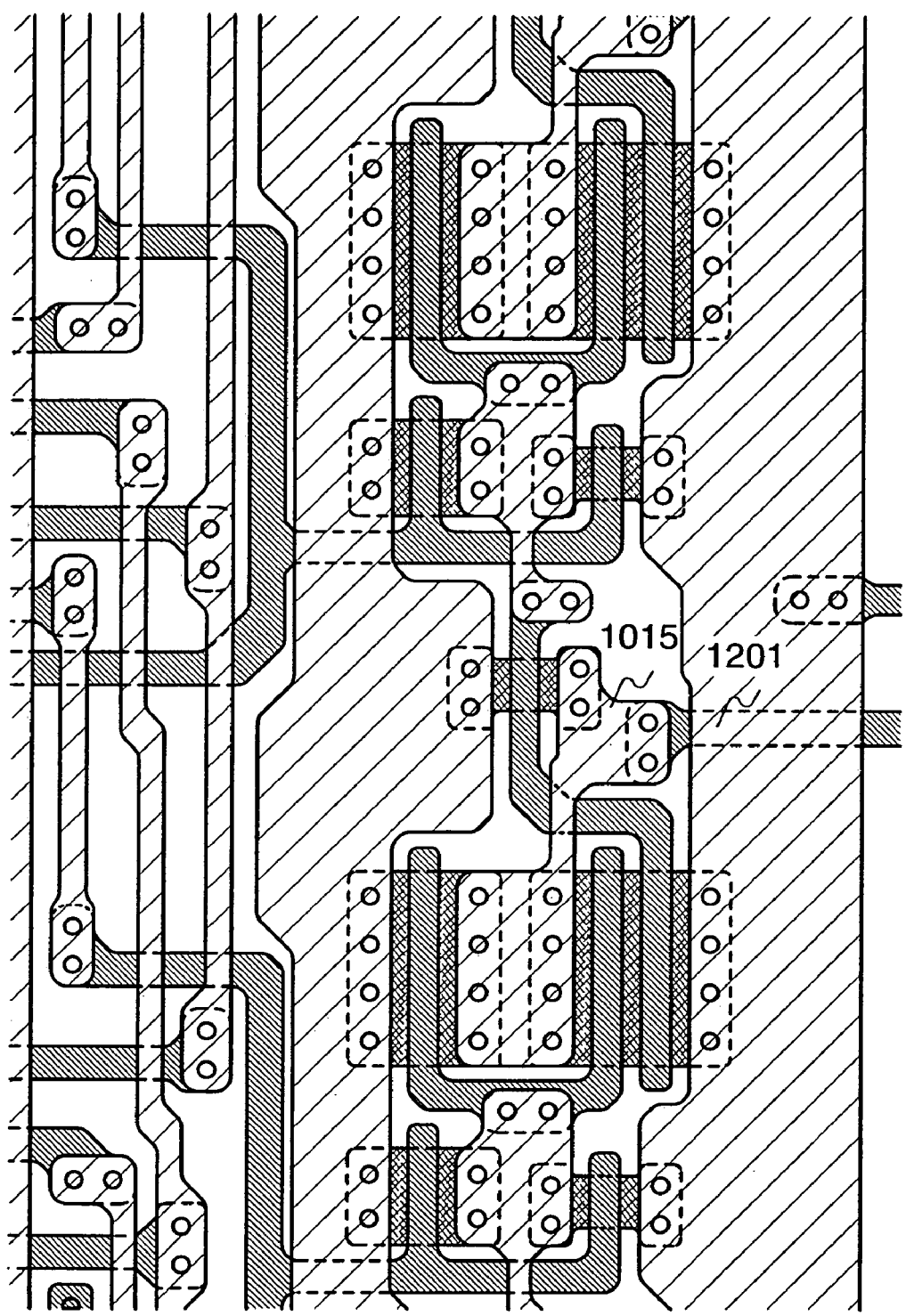
FIG. 13 is a diagram showing a layout of the semiconductor device of the invention.

As shown in FIG. 13, the wiring layer has a pattern in which the corner portion is round by removing a corner portion that is a right triangle in each corner portion bent into an L shape so that one side of the triangle is 10 μm or shorter, or with a length of ½ or less but ⅕ or more of the linewidth of the wiring. That is, the circumference of the wiring layer in the corner portion is formed to curve when seen from above. Specifically, in order to form a round circumference of the corner portion, a part of the wiring layer is removed, which corresponds to an isosceles right triangle having two first straight lines that are perpendicular to each other making the corner portion, and a second straight line that makes an angle of about 45 degrees with the two first straight lines. When removing the triangle, two obtuse angles are formed in the wiring layer; at this time, the wiring layer is preferably etched by appropriately adjusting the etching conditions and/or a mask design so that a curved line in contact with the first straight line and the second straight line is formed in each obtuse angle part. Note that the length of the two sides of the isosceles right triangle, which are equal to each other, is equal to or longer than ⅕ but equal to or shorter than ½ of the width of the wiring. In addition, the inner circumference of the corner portion is also formed to curve in accordance with the circumference thereof.

In a circuit having the layout shown in FIG. 13, by not bending the corner portion of the bending portion or at the position where the wiring width is changed, so much to provide roundness, it is possible to suppress generation of fines due to anomalous discharge when dry etching with plasma is performed. In addition, fines can be easily washed away without collecting in the corner portion in washing, thereby leading to the improvement of productivity. That is, the problem of dust or fines generated in a manufacturing process can be resolved. In particular, in the case of a wiring of a driver circuit portion or the like in which many parallel wirings are provided, to be able to wash away dust is extremely suitable.

Described in this embodiment is the mode in which the corner portion or the bending portion is round in the three layouts of the semiconductor layer, the gate wiring, and the wiring, however, the invention is not limited to this. That is, the corner portion or the bending portion may be round in any one of the layers so that the problem of dust, fines, or the like in a manufacturing process can be resolved.

If a semiconductor device is constituted using the above-described layout, a high-functional and low-power consumption semiconductor device can be provided at low cost with the weight reduced.

Note that this embodiment can be implemented freely combining with Embodiment Mode 1, Embodiment Mode 2, Embodiment Mode 3, or Embodiment 1.

Embodiment 3

In this embodiment, an example of forming a static RAM (SRAM) as one component of the semiconductor device of the invention is described with reference to FIGS. 6A to 8B. Note that it is suitable that the SRAM of this embodiment is employed for the RAM in the structure described in Embodiment Mode 1 and Embodiment Mode 2.

Figure 6A:
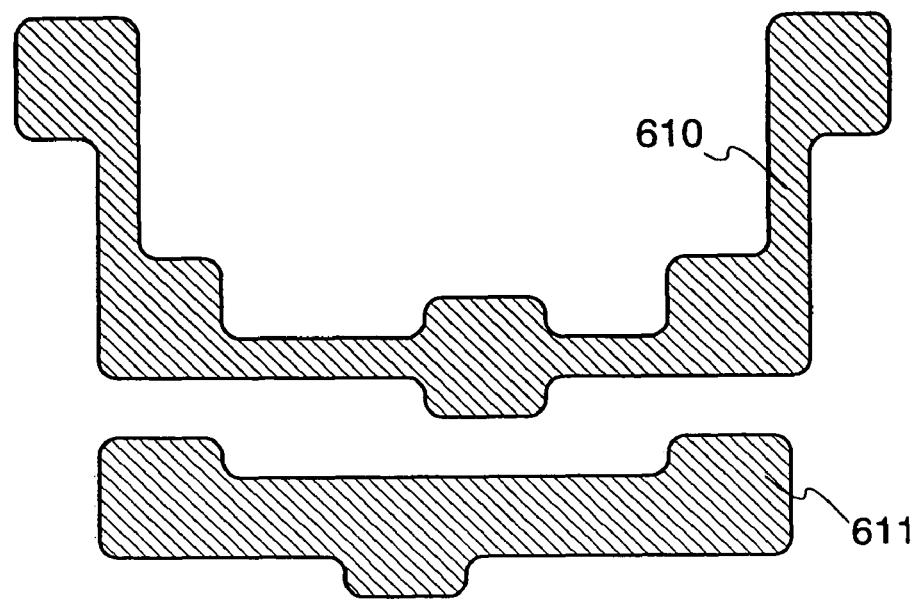
FIGS. 6A and 6B are diagrams each showing a layout of a semiconductor device of the invention.

Semiconductor layers 610 and 611 shown in FIG. 6A are preferably formed of silicon or a crystalline semiconductor containing silicon as its component. For example, polycrystalline silicon obtained by crystallizing a silicon film with laser annealing or the like, single crystalline silicon, or the like is employed. Other than the above, a metal oxide semiconductor, an amorphous silicon, or an organic semiconductor exhibiting a semiconductor characteristic can also be employed.

At any event, a semiconductor layer to be formed first is formed over an entire surface of a substrate having an insulating surface or a part thereof (a region having an area larger than that determined as a semiconductor region of a transistor). Then, with photolithography technology, a mask pattern is formed over the semiconductor layer. By carrying out etching treatment to the semiconductor layer with the mask pattern, the island-shaped semiconductor layers 610 and 611 each having a specific shape are formed which includes a source and drain region and a channel forming region of a TFT. The semiconductor layers 610 and 611 are determined in consideration with adequacy of the layout.

Figure 6B:
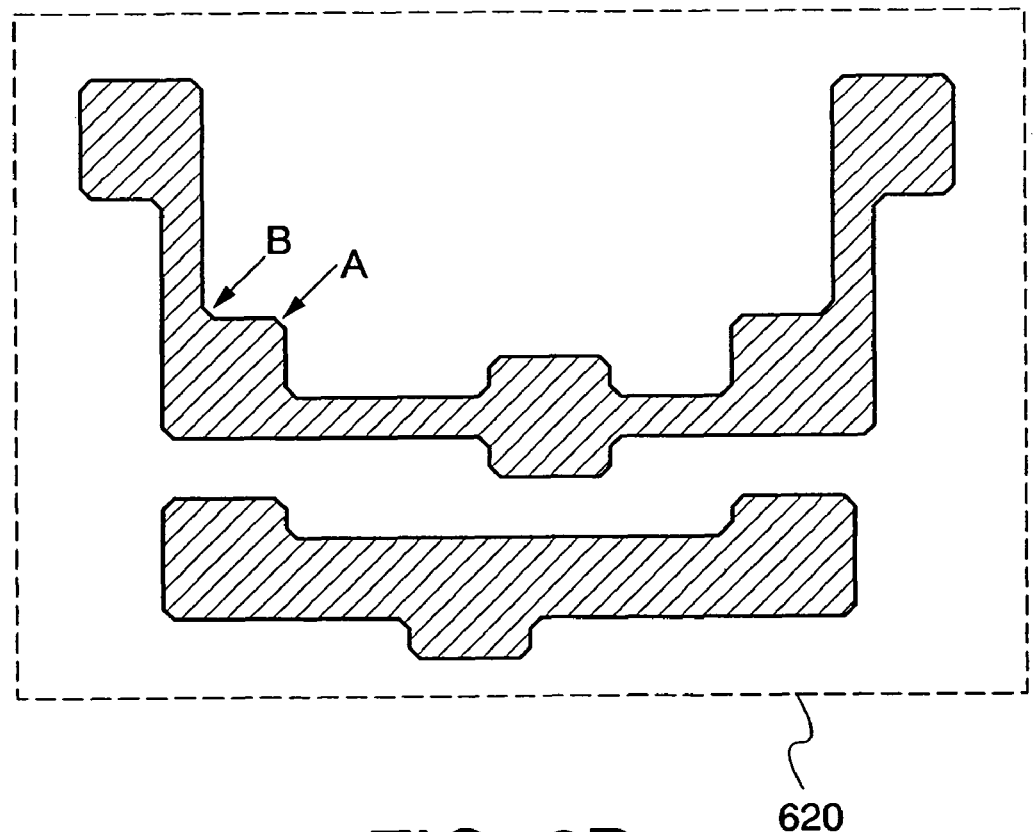

A photomask for forming the semiconductor layers 610 and 611 shown in FIG. 6A has a mask pattern 620 shown in FIG. 6B. This mask pattern 620 is different depending on whether a resist to be used in the photolithography process is a positive type or a negative type. In the case where a positive type resist is used, the mask pattern 620 shown in FIG. 6B is formed as a light shielding portion. The mask pattern 620 has a shape where a top portion A is cut. In addition, a bending portion B is bent plural times so as not to bend at right angle in the corner thereof. In this photomask pattern, for example, the corner portion of the pattern is removed with a length of 10 μm or less per side.

The shape of the mask pattern 620 shown in FIG. 6B is reflected in the semiconductor layers 610 and 611 shown in FIG. 6A. In that case, the homothetic shape of the mask pattern 620 may be transferred, or may be transferred such that the corner portion of the mask pattern 620 is more round. That is, a roundness in which the pattern shape is further less bent than the photomask pattern 620.

Figure 7A:
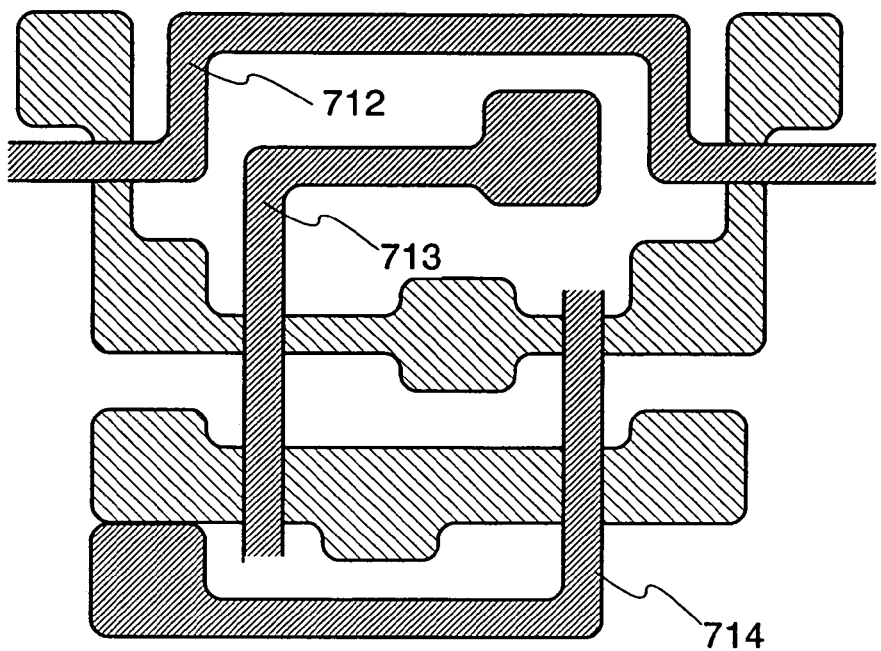
FIGS. 7A and 7B are diagrams each showing a layout of the semiconductor device of the invention.

Over the semiconductor layers 610 and 611, an insulating layer containing at least partially silicon oxide or silicon nitride is formed. One purpose of forming this insulating layer is a gate insulating layer. Then, as shown in FIG. 7A, gate wirings 712, 713, and 714 are formed so as to partially overlap with the semiconductor layers. The gate wiring 712 is formed corresponding to the semiconductor layer 610. The gate wiring 713 is formed corresponding to the semiconductor layers 610 and 611. In addition, the gate wiring 714 is formed corresponding to the semiconductor layers 610 and 611. As for the gate wiring, a metal layer or a highly-conductive semiconductor layer is formed to be a film, and the shape thereof is formed over the insulating layer with photolithography technology.

Figure 7B:
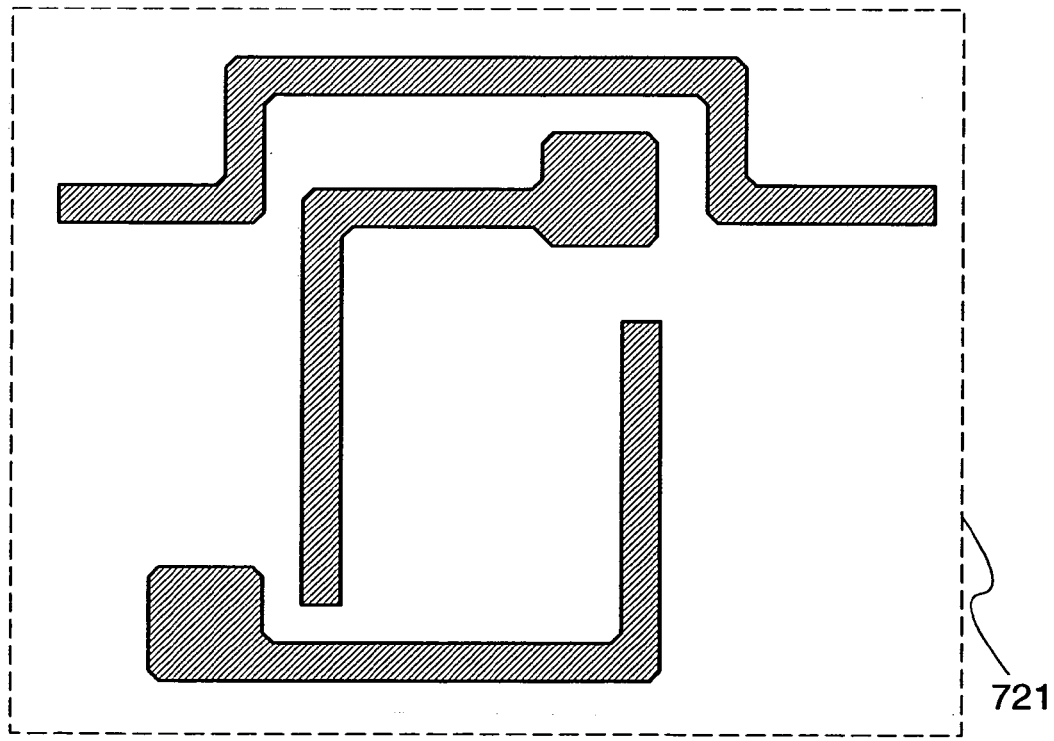

A photomask for forming the gate wiring has a mask pattern 721 shown in FIG. 7B. In the photomask pattern 721, the corner portion can be removed with a length of ½ or less but ⅕ or more of the linewidth of the wiring. The shape of the mask pattern 721 shown in FIG. 7B is reflected in the gate wirings 712, 713, and 714 shown in FIG. 7A. In that case, the homothetic shape of the mask pattern 721 may be transferred, or may be transferred such that the corner portion of the mask pattern 721 is more round. That is, a roundness in which the pattern shape thereof is further less bent than the photomask pattern 721. At the salient portion, it is possible to suppress generation of fines due to anomalous discharge when dry etching with plasma is performed. And, at the reentrant portion, even if there are fines generated, the fines which tend to collect in the corner portion can be washed away in washing. As a result, there is such effect that yield improvement can be extremely expected.

An interlayer insulating layer is a layer which is formed subsequently to the gate wirings 712, 713, and 714. The interlayer insulating layer is formed of an inorganic insulating material such as silicon oxide or an organic insulating material using polyimide, acrylic resin, or the like. An insulating layer made from silicon nitride, silicon nitride oxide, or the like may be interposed between this interlayer insulating layer and the gate wirings 712, 713, and 714. Furthermore, an insulating layer made from silicon nitride, silicon nitride oxide, or the like may be provided over the interlayer insulating layer as well. This insulating layer can prevent from contaminating the semiconductor layer or the gate insulating layer by an impurity which is not good for a TFF, such as an exogenous metal ion or moisture.

Figure 8A:
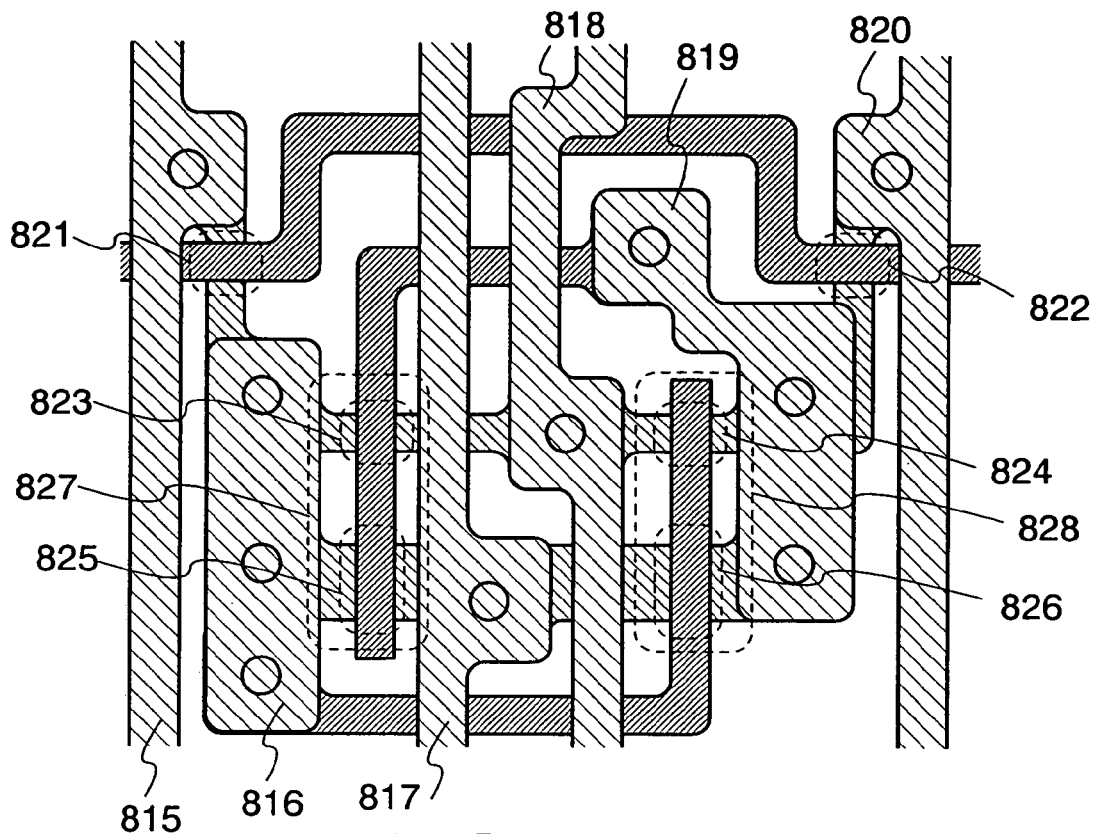
FIGS. 8A and 8B are diagrams each showing a layout of the semiconductor device of the invention.

In the interlayer insulating layer, an opening is formed at a predetermined position. For example, it is provided corresponding to the gate wiring or the semiconductor layer which is in the lower layer. As for the wiring layer which is formed of one layer or a plurality of layers made from a metal or a metal compound, a mask pattern is formed by photolithography technology and is formed to be a predetermined pattern by an etching process. Then, as shown in FIG. 8A, wirings 815 to 820 are formed so as to partially overlap with the semiconductor layers. With the wiring, predetermined elements can be connected to each other. The wiring does not connect the predetermined elements by a straight line but has a bending portion because of layout limitation. In addition, the wiring is changed in width in the contact portion or another region. In the contact portion, when the contact hole is equal to or larger than the wiring width, the wiring width is changed to be wider at that portion.

Figure 8B:
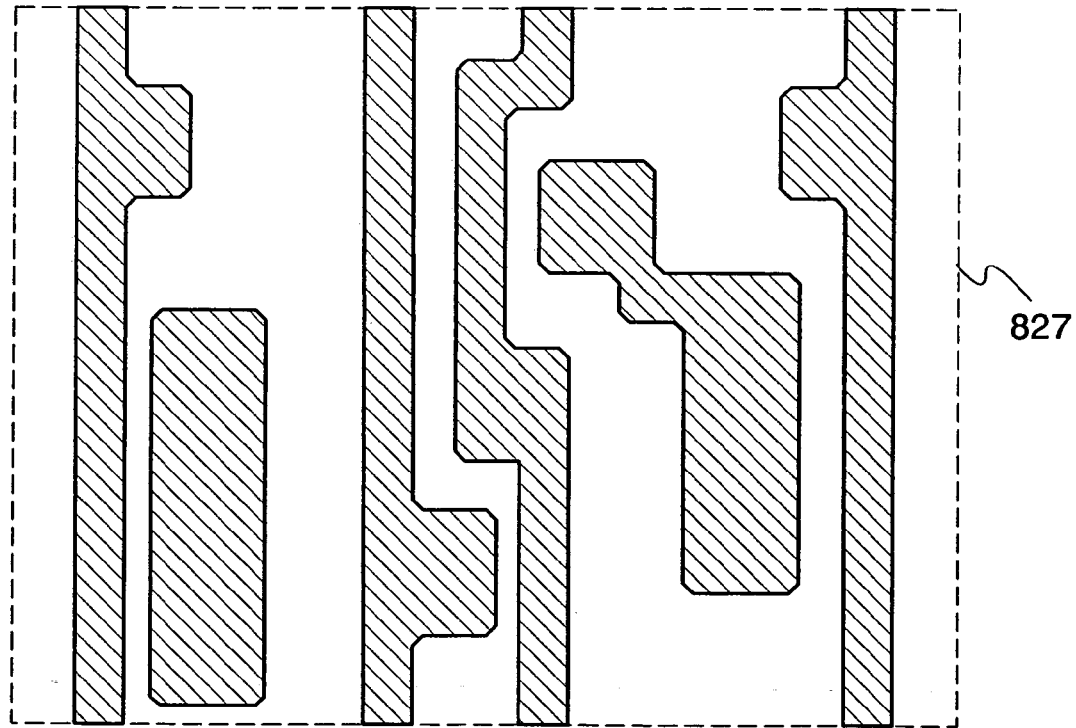

A photomask for forming the wirings 815 to 820 has a mask pattern 827 shown in FIG. 8B. In this case also, the wiring has a pattern in which the corner portion is removed with a length of ½ or less but ⅕ or more of the linewidth of the wiring to provide roundness in the corner portion. According to such wiring, at the salient portion, it is possible to suppress generation of fines due to anomalous discharge when dry etching with plasma is performed, and at the reentrant portion, even if there are fines generated, the fines which tend to collect in the corner portion can be washed away in washing. As a result, there is such effect that yield improvement can be extremely expected. In addition, in the case of a plurality of parallel wirings, it is extremely suitable in order to wash away dust.

In FIG. 8A, n-channel transistors 821 to 824 and p-channel transistors 825 and 826 are formed. Inverters 827 and 828 are constituted by the n-channel transistor 823 and the p-channel transistor 825, and the n-channel transistor 824 and the p-channel transistor 826 respectively. A circuit including the six transistors forms an SRAM. An insulating layer made from silicon nitride, silicon oxide, or the like may be formed in a layer over these transistors.

By adopting the above-described structure, a high-functional and low-power consumption semiconductor device can be provided at low cost with the weight reduced.

Note that this embodiment can be implemented freely combining with Embodiment Mode 1, Embodiment Mode 2, Embodiment Mode 3, Embodiment 1, or Embodiment 2.

Embodiment 4

In this embodiment, a transistor for constituting the semiconductor device of the invention is described with reference to FIGS. 9 to 14E.

Figure 9:
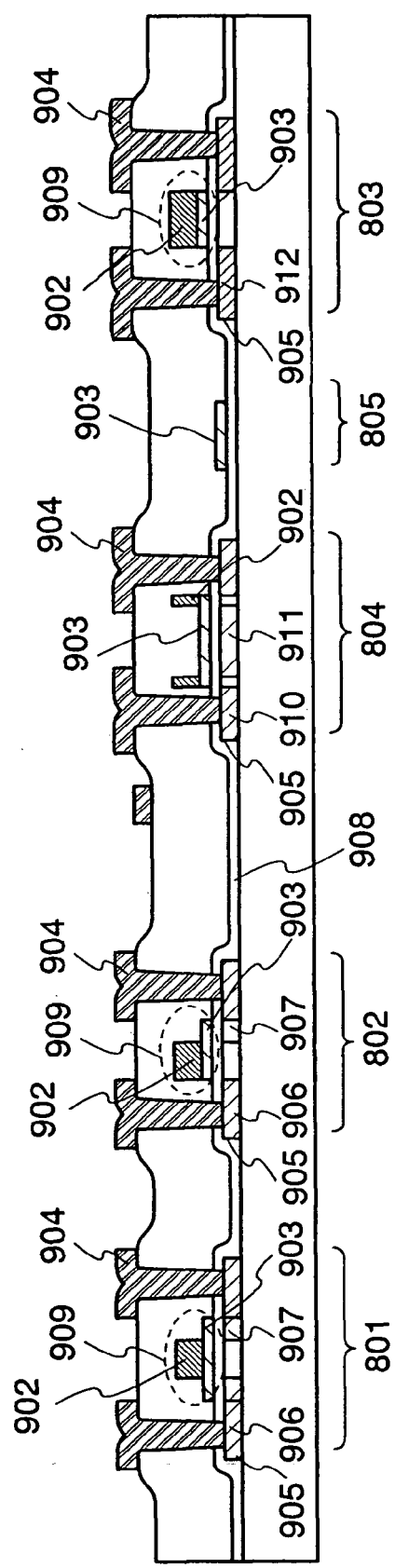
FIG. 9 is a cross-sectional view of a semiconductor device of the invention.

A transistor for constituting the semiconductor device of the invention can be constituted by a thin film transistor (TFT) as well as a MOS transistor formed over a single crystalline substrate. FIG. 9 is a view showing a cross-sectional structure of such transistors constituting a circuit. In FIG. 9, an n-channel transistor 801, an n-channel transistor 802, a capacitor 804, a resistor 805, and a p-channel transistor 803 are illustrated. As each transistor, a thin film transistor having a semiconductor layer 905, an insulating layer 908, and a gate electrode 909 can be used. The gate electrode 909 is formed by stacking a first conductive layer 903 and a second conductive layer 902. FIGS. 14A to 14D are top-plane views corresponding to the transistors, the capacitor and the resistor, which can be additionally referred.

In FIG. 9, in the n-channel transistor 801, in a channel length direction (a direction in which carriers flow), an impurity region 907 doped with an impurity at lower concentration than the impurity concentration of an impurity region 906 which forms a source or drain region forming contact with a wiring 904, which is also called a lightly-doped-drain (LDD), is formed in the semiconductor layer 905. Into the impurity region 906 and the impurity region 907, phosphorus or the like is added as the impurity to give n-type conductivity in the case of forming the n-channel transistor 801. LDDs are formed as means to suppress hot-electron deterioration and short-channel effect.

Figure 14A:
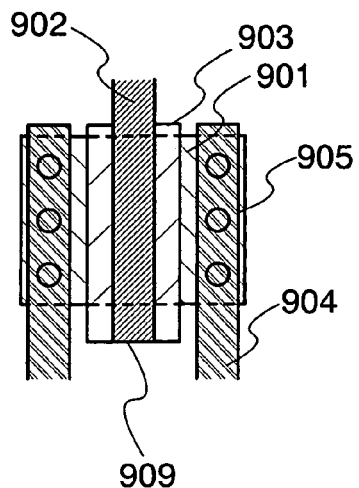
FIGS. 14A to 14E are diagrams each showing an electrical element constituting a semiconductor device of the invention.

As shown in FIG. 14A, in the gate electrode 909 of the n-channel transistor 801, the first conductive layer 903 is formed spreading on both sides of the second conductive layer 902. In this case, the thickness of the first conductive layer 903 is formed to be smaller than that of the second conductive layer. The first conductive layer 903 is formed with the thickness through which ion species accelerated in an electric field of 10 to 100 kV can pass. The impurity region 907 is formed so as to be covered by the first conductive layer 903 of the gate electrode 909. That is, an LDD region to be overlapped by the gate electrode 909 is formed. In this structure, a one-conductive type impurity is added into the impurity region 907 through the first conductive layer 903 with the second conductive layer 902 as a mask, thereby forming the impurity region 907 in a self-aligned manner. That is, an LDD to be covered by the gate electrode is formed in self-aligned manner.

The transistor having an LDD on both sides is applied to a rectifying TFT of the power supply circuit 208 described in Embodiment Mode 1 and Embodiment Mode 2, or a transistor for constituting a transmission gate (also called an "analog switch") used for a logic circuit. Since both positive and negative voltages are applied to the source or drain electrode of such a TFI, an LDD is preferably provided on both sides of the gate electrode.

In addition, in the case where a gate wiring is formed using the second conductive layer 902, the first conductive layer 903 may be patterned so as to get respective both ends of the two layers lined up as well. As a result of this, a minute gate wiring can be formed. In addition, it is not necessary to form an LDD to be overlapped by the gate electrode in a self-aligned manner.

Figure 14B:
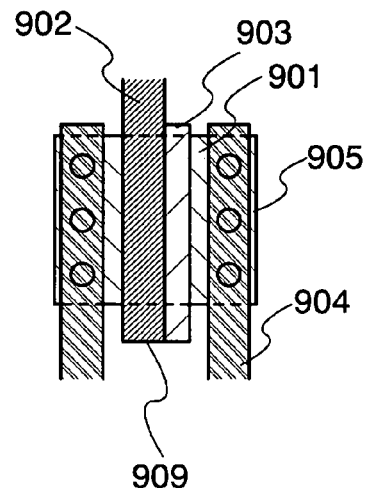
Figure 14C:
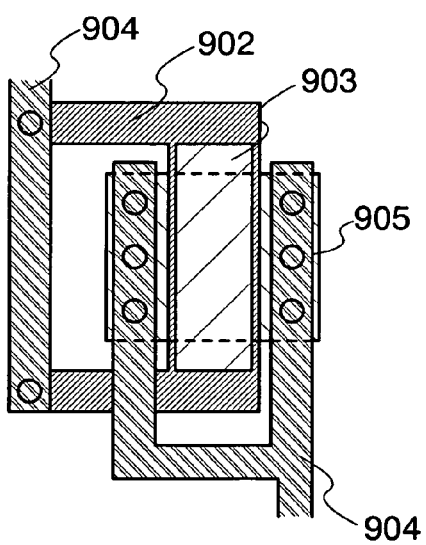
Figure 14D:
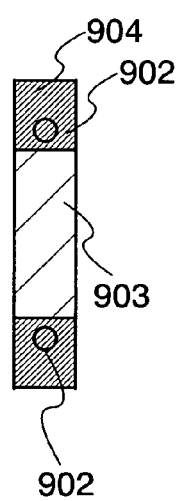
Figure 14E:
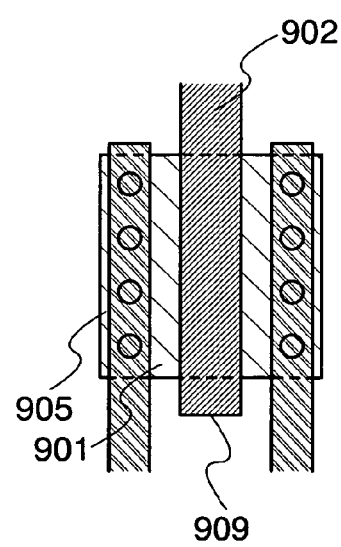

In FIG. 9, in the n-channel transistor 802, the impurity region 907 doped with an impurity at lower concentration than the impurity concentration of the impurity region 906 is formed on one side of the gate electrode in the semiconductor layer 905. As shown in FIG. 14B, in the gate electrode 909 of the n-channel transistor 802, the first conductive layer 903 is formed spreading on one side of the second conductive layer 902. In this case also, a one-conductive type impurity is added through the first conductive layer 903 with the second conductive layer 902 as a mask, thereby the LDD can be formed in a self-aligned manner.

The transistor having an LDD on one side may be applied to a transistor in which only one of positive voltage or negative voltage is applied between the source and drain electrodes. Specifically, it may be applied to a transistor for constituting a logic gate such as an inverter circuit, a NAND circuit, a NOR circuit, and a latch circuit or a transistor for constituting an analog circuit such as a sense amplifier, a constant voltage generating circuit, and a voltage controlled oscillator (hereinafter also called a "VCO").

In FIG. 9, the capacitor 804 is formed in which the gate insulating layer 908 is interposed between the first conductive layer 903 and the semiconductor layer 905. In the semiconductor layer 905 for forming the capacitor 804, an impurity region 910 and an impurity region 911 are-provided. The impurity region 911 is formed in a position so as to be covered by the first conductive layer 903 in the semiconductor layer 905. In addition, the impurity region 910 forms contact with the wiring 904. The impurity region 911 can be formed by adding a one-conductivity type impurity through the first conducting layer 903, therefore, the conductivity can be given to the impurity region 910 and the impurity region 911 by adding the same impurity. At any event, the semiconductor layer 905 which functions as an electrode in the capacitor 804 is preferably reduced in resistance by adding the one-conductivity type impurity. In addition, the first conductive layer 903 can be functioned sufficiently as an electrode by using the second conductive layer 902 as an auxiliary electrode as show in FIG. 14C. By adopting such composite electrode structure in which the first conductive layer 903 and the second conductive layer 902 are combined, the capacitor 804 can be formed in a self-aligned manner.

The capacitor is used as a storage capacitor provided in the power supply circuit 208 or as a resonant capacitor provided in the resonance circuit 207 in Embodiment Mode 1 and Embodiment Mode 2. In particular, the resonant capacitor in which both positive voltage and negative voltage are applied between two terminals of the capacitor is required to function as a capacitor regardless of whether the voltage between the two terminals is positive or negative.

In FIG. 9, the resistor 805 is constituted by the first conductive layer 903. Since the first conductive layer 903 is formed with a thickness of about 30 to 150 nm, the resistor can be constituted by arbitrarily setting its width and length.

The resistor is used as a resistance load provided in the modulation circuit 212 in Embodiment Mode 1 and Embodiment Mode 2. In addition, it may be used as a load in the case of controlling current by a VCO or the like. The resistor may be constituted by a semiconductor layer containing an impurity element at high concentration, or a thin metal layer. Compared with the semiconductor layer in which the resistance value depends on film thickness, film quality, impurity concentration, activation rate, or the like, the metal layer in which the resistance value is determined by film thickness and film quality is suitable because variation is small.

In FIG. 9, the p-channel transistor 803 has an impurity region 912 in the semiconductor layer 905. This impurity region 912 forms a source or drain region forming contact with the wiring 904. In a structure of the gate electrode 909, the first conductive layer 903 and the second conductive layer 902 are superposed each other. The p-channel transistor 803 is a transistor of a single drain structure in which an LDD is not provided. When the p-channel transistor 803 is formed, boron or the like is added as an impurity to give p-type conductivity into the impurity region 912. On the other hand, if phosphorus is added into the impurity region 912, an n-channel transistor of a single drain structure can be formed as well.

To one or both of the semiconductor layer 905 and the gate insulating layer 908, oxidation or nitrogenation treatment may be performed with high-density plasma treatment in which plasma is excited by microwave, the electron temperature is 2 eV or less, the ion energy is 5 eV or less, and the electron density is about $10^{11}$ to $10^{13}$ cm$^{-3}$. At this time, the treatment may be carried out by setting the substrate temperature at 300 to 450° C. and in an oxidation atmosphere (e.g., $O_2$ or $N_2O$) or a nitrogenation atmosphere (e.g., $N_2$ or $NH_3$), thereby the defect level of an interface between the semiconductor layer 905 and the gate insulating layer 908 can be reduced. By performing this treatment to the gate insulating layer 908, densification of this insulating layer can be achieved. That is, generation of an electric charge defect is suppressed and change of the threshold voltage of the transistor can be suppressed. In addition, in the case where the transistor is operated at a voltage of 3 V or less, this insulating layer oxidized or nitrogenized with the plasma treatment can be applied as the gate insulation layer 908. In addition, in the case where the driving voltage of the transistor is 3 V or more, the gate insulation layer 908 can be formed by combining the insulating layer formed over a surface of the semiconductor layer 905 with the plasma treatment and an insulating layer stacked by a CVD method (plasma CVD method or thermal CVD method) each other. In addition, this insulating layer can also be used as a dielectric layer of a capacitor. In this case, since the insulating layer formed with plasma treatment is a dense film formed with a thickness of 1 to 10 nm, a capacitor having large charge capacity can be formed.

As described with reference to FIGS. 9 and 14A to 14E, by combining conductive layers having different thickness, an element of various structures can be formed. A region where only the first conductive layer is formed and a region where the first conductive layer and the second conductive layer are stacked can be formed using a photomask or a reticle which is provided with a diffraction grating pattern or an auxiliary pattern having an optical intensity reducing function formed of a semitransparent film. That is, in a photolithography process, the quantity of transmitting light of the photomask is controlled in exposing the photoresist so that the thickness of a resist mask to be developed is changed. In this case, a slit at the resolution limit or less may be provided in the photomask or the reticle to form the above-described resist having the complex shape. In addition, by baking at about 200° C. after developing, a mask pattern made from a photoresist material can be changed in shape.

In addition, by using the photomask or the reticle which is provided with a diffraction grating pattern or an auxiliary pattern having an optical intensity reducing function formed of a semitransparent film, the region where only the first conductive layer is formed and the region where the first conductive layer and the second conductive layer are stacked can be formed in succession. As shown in FIG. 14A, the region where only the first conductive layer is formed can be formed selectively over the semiconductor layer. Such a region is effective over the semiconductor layer, but is not required in the other region (a wiring region which is successive to the gate electrode). Because the region where only the first conductive layer is formed is not required to be formed in the wiring region by using this photomask or reticle, wiring density can be improved substantially.

In the case of FIG. 9 and FIGS. 14A to 14E, the first conductive layer is formed of a high-melting-point metal such as tungsten (W), chromium (Cr), tantalum (Ta), tantalum nitride (TaN) or molybdenum (Mo), or an alloy or a compound containing the high-melting-point metal as its main component with a thickness of 30 nm to 50 nm. In addition, the second conductive layer is formed of a high-melting-point metal such as tungsten (W), chromium (Cr), tantalum (Ta), tantalum nitride (TaN) or molybdenum (Mo), or an alloy or a compound containing the high-melting-point metal as its main component with a thickness of 300 nm to 600 nm. For example, different conductive materials are used for the first conductive layer and the second conductive layer respectively so that there occurs difference in etching rate therebetween in a later etching process. As an example, TaN film can be used for the first conductive layer and a tungsten film can be used for the second conductive layer.

According to the description of this embodiment, transistors having different electrode structures, a capacitor, and a resistor can be formed separately with the same patterning process by using the photomask or the reticle which is provided with a diffraction grating pattern or an auxiliary pattern having an optical intensity reducing function formed of a semitransparent film. Accordingly, in accordance with circuit characteristics, elements having different modes can be formed without increasing the number of steps and integrated.

If a semiconductor device is constituted by the above-described transistors, a high-functional and low-power consumption semiconductor device can be provided at low cost with the weight reduced.

Note that this embodiment can be implemented freely combining with Embodiment Mode 1, Embodiment Mode 2, Embodiment Mode 3, Embodiment 1, Embodiment 2, or Embodiment 3.

Embodiment 5

In this embodiment, an example of a system using the semiconductor device of the invention is described with reference to FIGS. 15 and 16. Described in this embodiment is a user authentication system of a personal computer with high security, using the semiconductor device of the invention.

Figure 15:
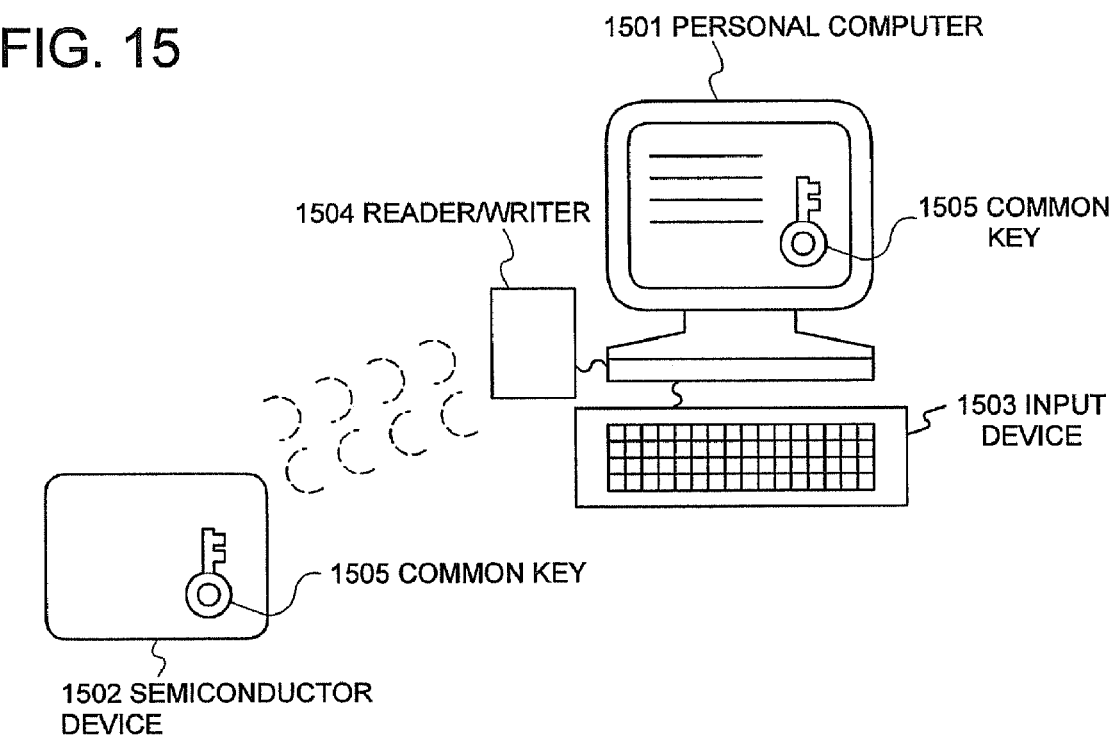
FIG. 15 is a schematic diagram of a user authentication system with a semiconductor device of the invention.
Figure 16:
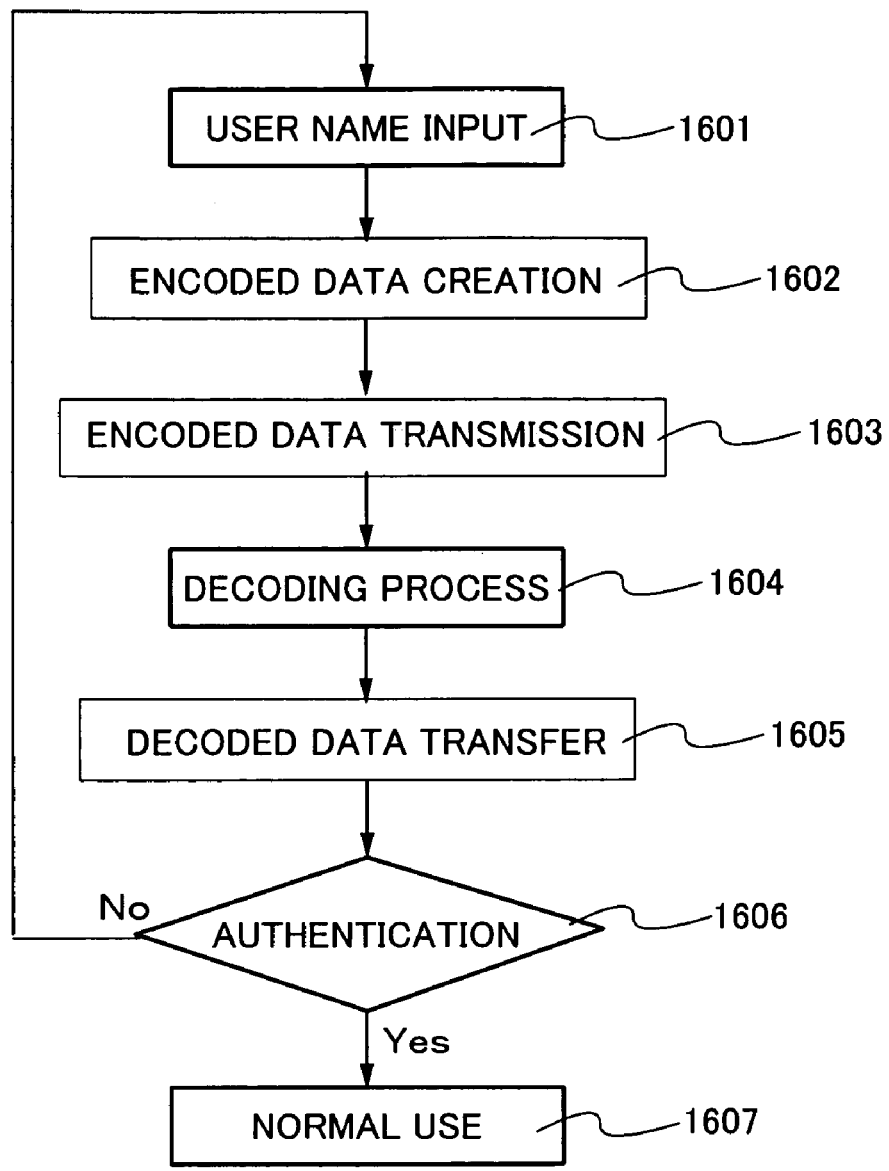
FIG. 16 is a flow chart of a user authentication system with the semiconductor device of the invention.

FIG. 15 is a schematic diagram of the user authentication system of this embodiment, which includes a personal computer 1501 and a semiconductor device 1502. An input device 1503 and a reader/writer 1504 are connected to the personal computer 1501.

Both of the personal computer 1501 and the semiconductor device 1502 has a common key 1505 for encoding. Specifically, data of the common key 1505 is stored in respective memories of the personal computer 1501 and the semiconductor device 1502. The common key 1505 is, for example, data of 64 to 128 bits, which is used for encoding a plain text (data before being encoded) and decoding an encoded text. As for the common key, the common keys are formed differently per user who is registered officially and the personal computer 1501 has all of them. That is, the personal computer 1501 has the same number of common keys as the number of users registered officially. On the other hand, the semiconductor device 1502 is owned by a user who registered officially, and has only the common key specific to the user. The common key must be kept without being known to another person.

Although the case where a common key encoding method (see a standard of ISO/IEC 9798-2 information technology-security techniques-entityauthentication-Part2: mechanisms using symmetric encipherment algorithms) is used as the encoding method is described in this embodiment, the invention can be easily applied to the case of another encoding method such as a public key encoding method (see a standard of ISO/IEC 9798-3 information technology-security techniques-entity authentication-Part3: Mechanisms using digital signature techniques).

The personal computer 1501 has means for encoding a plain text by using the common key 1505. Specifically, software of carrying out encoding algorithm is provided. In addition, the semiconductor device 1502 has means for decoding an encoded text by using the common key 1505. Specifically, decoding algorithm is carried out in the arithmetic circuit described in Embodiment Mode 1 or Embodiment Mode 2.

Hereinafter, usage of the user authentication system of this embodiment is described with reference to a flow chart of FIG. 16.

First, a use applicant inputs a user name and a password of the personal computer 1501 with the input device 1503 (USER NAME INPUT 1601). The password is registered in advance by a user who is registered officially. The personal computer 1501 encodes a plain text by using a corresponding common key depending on the input user name (ENCODED DATA CREATION 1602). Here, a plain text may be either data having a specific meaning or data having no meaning. Next, the encoded data is transferred from the reader/writer 1504 (ENCODED DATA TRANSMISSION 1603). The semiconductor device 1502 receives the encoded data, decodes it with the common key 1505 (DECODING PROCESS 1604), and transferred the decoded data to the reader/writer (DECODED DATA TRANSFER 1605). The personal computer 1501 compares the decoded data with the first plain text (AUTHENTICATION 1606), and only in the case where they are matched with each other, authorizes the use applicant as the user registered officially and enables to use (NORMAL USE 1607).

According to the user authentication system of this embodiment as described above, a computer cannot be utilized only for persons who own his password and the semiconductor device of the invention. Therefore, security is extremely higher than authentication only with a password. In addition, a user can utilize a personal computer with the same way as that in the conventional authentication only with a password if the semiconductor device is taken along by the user, therefore, which does not require additional obligations so much.

Note that, although the description is made of the user authentication of a personal computer, the invention can be easily applied to another system capable of being utilized only by a user who is registered officially. For example, the invention can be easily applied to an ATM (Automated Teller Machine), a CD (Cash Dispenser), or the like.

By adopting the above-described structure, a user authentication system with extremely high security using the semiconductor device of the invention can be established at low cost.

Note that this embodiment can be implemented freely combining with Embodiment Mode 1, Embodiment Mode 2, Embodiment Mode 3, Embodiment 1, Embodiment 2, Embodiment 3, or Embodiment 4.

(Subjoinder) As set forth above, as is explained, the mode of the invention includes the following:

A semiconductor device provided with an antenna for transmitting and receiving a communication signal, in which a receiving circuit for discriminating the communication signal, an arithmetic circuit for performing a decoding/encoding process in transmitting or receiving encoded data, a transmitting circuit for transmitting an arithmetic result of the arithmetic circuit, and a state control register for stopping operation of the arithmetic circuit when receiving a communication signal and stopping operation of the receiving circuit and the transmitting circuit when operating the arithmetic circuit are included.

A semiconductor device provided with an antenna for transmitting and receiving a communication signal, in which a receiving circuit for discriminating the communication signal, an arithmetic circuit including a read only memory for storing a program of an arithmetic process and a working memory for storing content of the arithmetic process, for processing data by carrying out the program in accordance with content of decoded data, a transmitting circuit for transmitting an arithmetic result of the arithmetic circuit, and a state control register for stopping operation of the arithmetic circuit when receiving a communication signal and stopping operation of the receiving circuit and the transmitting circuit when operating the arithmetic circuit are included.

A semiconductor device provided with an antenna for transmitting or receiving a communication signal, in which a receiving circuit for discriminating the communication signal, an arithmetic circuit for performing a decoding/encoding process in transmitting and receiving encoded data, a transmitting circuit for transmitting an arithmetic result of the arithmetic circuit, and a state control register for operating the receiving circuit while stopping operation of the arithmetic circuit when the operating magnetic field varies and for stopping the receiving circuit while operating the arithmetic circuit when the operating magnetic field does not vary are included.

A semiconductor device provided with an antenna for transmitting or receiving a communication signal, in which a receiving circuit for discriminating the communication signal, an arithmetic circuit including a read only memory for storing a program of an arithmetic process and a working memory for storing content of the arithmetic process, for processing data by carrying out the program in accordance with content of decoded data, a transmitting circuit for transmitting an arithmetic result of the arithmetic circuit, and a state control register for operating the receiving circuit while stopping operation of the arithmetic circuit when the operating magnetic field varies and for stopping the receiving circuit while operating the arithmetic circuit when the operating magnetic field does not vary are included.

A driving method of a semiconductor device including a receiving circuit for discriminating a communication signal, an arithmetic circuit, a transmitting circuit for transmitting an arithmetic result of the arithmetic circuit, and a state control register for controlling operation of the arithmetic circuit, the receiving circuit and the transmitting circuit, in which a step of demodulating the communication signal and discriminating an SOF signal, reception data, and an EOF signal, a step of changing the state of the control register into an arithmetic processing state when an EOF signal is received, a step of performing an arithmetic process in accordance with the reception data in the arithmetic circuit, a step of changing the state of the control register into a transmission processing state when the arithmetic process is completed, a step of processing the result of the arithmetic process in accordance with the format of the communication signal and outputting to a modulating circuit, and a step of changing the state of the control register into a reception processing state when the transmission is completed are included.

A driving method of a semiconductor device including a receiving circuit for discriminating a communication signal, an arithmetic circuit, a transmitting circuit for transmitting an arithmetic result of the arithmetic circuit, and a state control register for controlling operation of the arithmetic circuit, the receiving circuit and the transmitting circuit, in which a step of demodulating the communication signal and discriminating an SOF signal, reception data, and an EOF signal, a step of changing the state of the control register into an arithmetic processing state when an EOF signal is received, a step of decoding encoded data and performing an arithmetic process of the predetermined content, in accordance with the content of the data in the arithmetic circuit, a step of changing the state of the control register into a transmission processing state when the arithmetic process is completed, a step of processing the result of the arithmetic process in accordance with the format of the communication signal and outputting to a modulating circuit, and a step of changing the state of the control register into a reception processing state when the transmission is completed are included.

The present application is based on Japanese Patent Application serial No. 2005-158227 filed on May 30, 2005 in Japanese Patent Office, the entire contents of which are hereby incorporated by reference.

The invention claimed is:

1. A semiconductor device comprising:
an antenna for transmitting and receiving a communication signal;
a receiving circuit for discriminating the communication signal;
a state control register having bit fields for a reception processing state flag, an arithmetic processing state flag, and a transmission processing state flag,
an arithmetic circuit for performing a decoding and encoding process for encoded receiving and transmitting data, the arithmetic circuit configured to operate based on the reception processing state flag, the arithmetic processing state flag, and the transmission processing state flag; and
a transmitting circuit for transmitting an arithmetic result of the arithmetic circuit;
wherein the receiving circuit operates while stopping operation of the arithmetic circuit and the transmitting circuit when an operating magnetic field varies;
wherein the arithmetic circuit operates while stopping operation of the receiving circuit and the transmitting circuit when the operating magnetic field does not vary;
wherein the transmitting circuit operates while stopping operation of the receiving circuit and the arithmetic circuit when the operating magnetic field varies;
wherein a state of the state control register changes into an arithmetic processing state after a reception process is completed;
wherein a state of the state control register changes into a transmission processing state after an arithmetic process is completed; and
wherein a state of the state control register changes into a reception processing state when transmission is completed.

2. A semiconductor device comprising:
an antenna for transmitting and receiving a communication signal;
a receiving circuit for discriminating the communication signal;
a state control register having bit fields for a reception processing state flag, an arithmetic processing state flag, and a transmission processing state flag,
an arithmetic circuit including a read only memory for storing a program of an arithmetic process and a working memory for storing content of the arithmetic process, for processing data by carrying out the program in accordance with content of decoded data, the arithmetic circuit configured to operate based on the reception processing state flag, the arithmetic processing state flag, and the transmission processing state flag; and
a transmitting circuit for transmitting an arithmetic result of the arithmetic circuit;
wherein the receiving circuit operates while stopping operation of the arithmetic circuit and the transmitting circuit when an operating magnetic field varies;
wherein the arithmetic circuit operates while stopping operation of the receiving circuit and the transmitting circuit when the operating magnetic field does not vary;
wherein the transmitting circuit operates while stopping operation of the receiving circuit and the arithmetic circuit when the operating magnetic field varies;
wherein a state of the state control register changes into an arithmetic processing state after a reception process is completed;
wherein a state of the state control register changes into a transmission processing state after the arithmetic process is completed; and
wherein a state of the state control register changes into a reception processing state when transmission is completed.

3. The semiconductor device according to claim 1 or 2, wherein the receiving circuit, the arithmetic circuit, the transmitting circuit, and the state control register are formed of thin film transistors over a substrate having an insulating surface.

* * * * *

UNITED STATES PATENT AND TRADEMARK OFFICE
CERTIFICATE OF CORRECTION

| | | |
|---|---|---|
| PATENT NO. | : 7,738,839 B2 | Page 1 of 1 |
| APPLICATION NO. | : 11/440117 | |
| DATED | : June 15, 2010 | |
| INVENTOR(S) | : Yoshiyuki Kurokawa | |

It is certified that error appears in the above-identified patent and that said Letters Patent is hereby corrected as shown below:

At column 3, line 12, please change "device of the" to --device of the invention.--;

At column 7, line 3, please change "writer" to --writer.--;

At column 12, line 10, please change "to to" to --to--;

At column 15, line 67, please change "$^1/_2$or less but $^1/_5$or more" to --$^1/_2$ or less but $^1/_5$ or more--;

At column 16, line 16, please change "$^1/_5$but equal to or shorter than $^1/_2$ of" to --$^1/_5$ but equal to or shorter than $^1/_2$ of--;

At column 18, line 4, please change "TFF" to --TFT--;

At column 18, line 26, please change "$^1/_2$or less but $^1/_5$or more" to --$^1/_2$ or less but $^1/_5$ or more--;

At column 19, line 39, please change "TFI" to --TFT--;

At column 20, line 5, please change "are-provided" to --are provided--.

Signed and Sealed this

Thirtieth Day of November, 2010

David J. Kappos
*Director of the United States Patent and Trademark Office*